United States Patent [19]
Ogura et al.

[11] Patent Number: 5,377,322
[45] Date of Patent: Dec. 27, 1994

[54] INFORMATION HANDLING METHOD AND SYSTEM UTILIZING MULTIPLE INTERCONNECTED PROCESSORS AND CONTROLLERS

[75] Inventors: Hiroyuki Ogura, Hino; Katsumi Kawano, Kawasaki; Kinji Mori, Machida; Hirokazu Kasashima, Hitachi; Manabu Shinomoto, Katsuta; Yasuo Suzuki, Ebina; Masayuki Orimo, Kawasaki, all of Japan

[73] Assignee: Hitachi, Ltd., Tokyo, Japan

[21] Appl. No.: 553,406

[22] Filed: Jul. 17, 1990

[30] Foreign Application Priority Data

Jul. 19, 1989 [JP] Japan ................ 1-184635

[51] Int. Cl.⁵ ........................... G06F 15/16
[52] U.S. Cl. ........................... 395/200; 395/575
[58] Field of Search ............ 395/200, 325, 575; 371/9.1

[56] References Cited

U.S. PATENT DOCUMENTS

| | | | |
|---|---|---|---|
| 4,025,905 | 5/1977 | Gorgens ................ | 395/275 |
| 4,366,479 | 12/1982 | Mori et al. ............. | 340/825.05 |
| 4,442,502 | 4/1984 | Friend et al. ........... | 364/900 |
| 4,462,075 | 7/1984 | Mori et al. ............. | 395/200 |
| 4,477,881 | 10/1984 | Kobayashi et al. ....... | 395/200 |
| 4,477,882 | 10/1984 | Schumacher et al. ...... | 364/900 |
| 5,121,486 | 6/1992 | Kurihara et al. ........ | 395/325 |
| 5,134,712 | 7/1992 | Yamamoto .............. | 395/800 |

FOREIGN PATENT DOCUMENTS

| | | |
|---|---|---|
| 0069438 | 1/1983 | European Pat. Off. . |
| 0139125 | 5/1985 | European Pat. Off. . |
| 0178473 | 4/1986 | European Pat. Off. . |
| 0230029 | 7/1987 | European Pat. Off. . |
| 0258650 | 3/1988 | European Pat. Off. . |
| 0276468 | 8/1988 | European Pat. Off. . |
| 1572894 | 8/1980 | United Kingdom . |

OTHER PUBLICATIONS

Japanese Literature "Fault Tolerant System" by Grey. Translated by Eiichi Watanabe MacGraw Hill. pp. 57–71.

Primary Examiner—Dale M. Shaw
Assistant Examiner—D. Dinh
Attorney, Agent, or Firm—Antonelli, Terry, Stout & Kraus

[57] ABSTRACT

Several processors and several communication control units are connected to a transmission medium. Each communication control unit has one or more terminal devices connected to it, and so any terminal device can be coupled to any processor. Each processor includes a central processing unit, a memory, and a control manager. The memory stores first information regarding processing being done with a terminal device coupled to the processor and second information regarding the communication control units connected to each of the processors and regarding the terminal devices being serviced by the processor. The control manager manages the communication control units based on the stored information. Information about the connections between the processors and the communication control units is broadcast to all processors. If any processor is faulty, another processor can take over the processing being done by the faulty processor. Likewise, further, processors can be added to the network, and their connection status is known to all other processors.

16 Claims, 22 Drawing Sheets

FIG. 4

| TERMINAL NO. | DISPLAY ITEM NAME 1 | DISPLAY ITEM NAME 2 | . . . . |
|---|---|---|---|
| 511 | COMPANY A | | |
| 512 | COMPANY B | COMPANY C | . . . . |
| | | | |
| 51k | | | |
| 521 | COMPANY D | COMPANY A | . . . . |
| | | | |
| 52k | | | |
| ⋮ | ⋮ | ⋮ | |

FIG. 5

| CPU | DEDICATED CCU | BACKUP CCU |
|---|---|---|
| 11 | 41, 42 | 48, 43 |
| 12 | 43, 44 | 42, 45 |
| 13 | 45, 46 | 44, 47 |
| 14 | 47, 48 | 46, 41 |

FIG. 6

| CPU | B-EXP 1 | B-EXP 2 | B-EXP 3 |
|---|---|---|---|
| 11 | 41 | 42 | 0 |
| 12 | 43 | 44 | 0 |
| 13 | 45 | 46 | 0 |
| 14 | 47 | 48 | 0 |

FIG. 7

| TH | DISC | B-EXP1 | B-EXP2 | B-EXP3 | ... |
|----|------|--------|--------|--------|-----|
| 11 | 0 | 0 | 0 | 0 | ... |
| 12 | 0 | 0 | 0 | 0 | ... |
| 13 | 0 | 1 | 0 | 0 | ... |
| 14 | 0 | 0 | 0 | 0 | ... |

0: NORMAL     1: ABNORMAL

FIG. 8

| CC1 | SA | B-EXP 1 | B-EXP 2 | B-EXP 3 | IOSTS |
|-----|----|---------|---------|---------|-------|

FIG. 9

| CC2 | SA | ENO | EC | B-EXP 1 | B-EXP 2 | B-EXP 3 |
|-----|----|----|----|---------|---------|---------|

| MY-EXP 1 | MY-EXP 2 | MY-EXP 3 |
|----------|----------|----------|

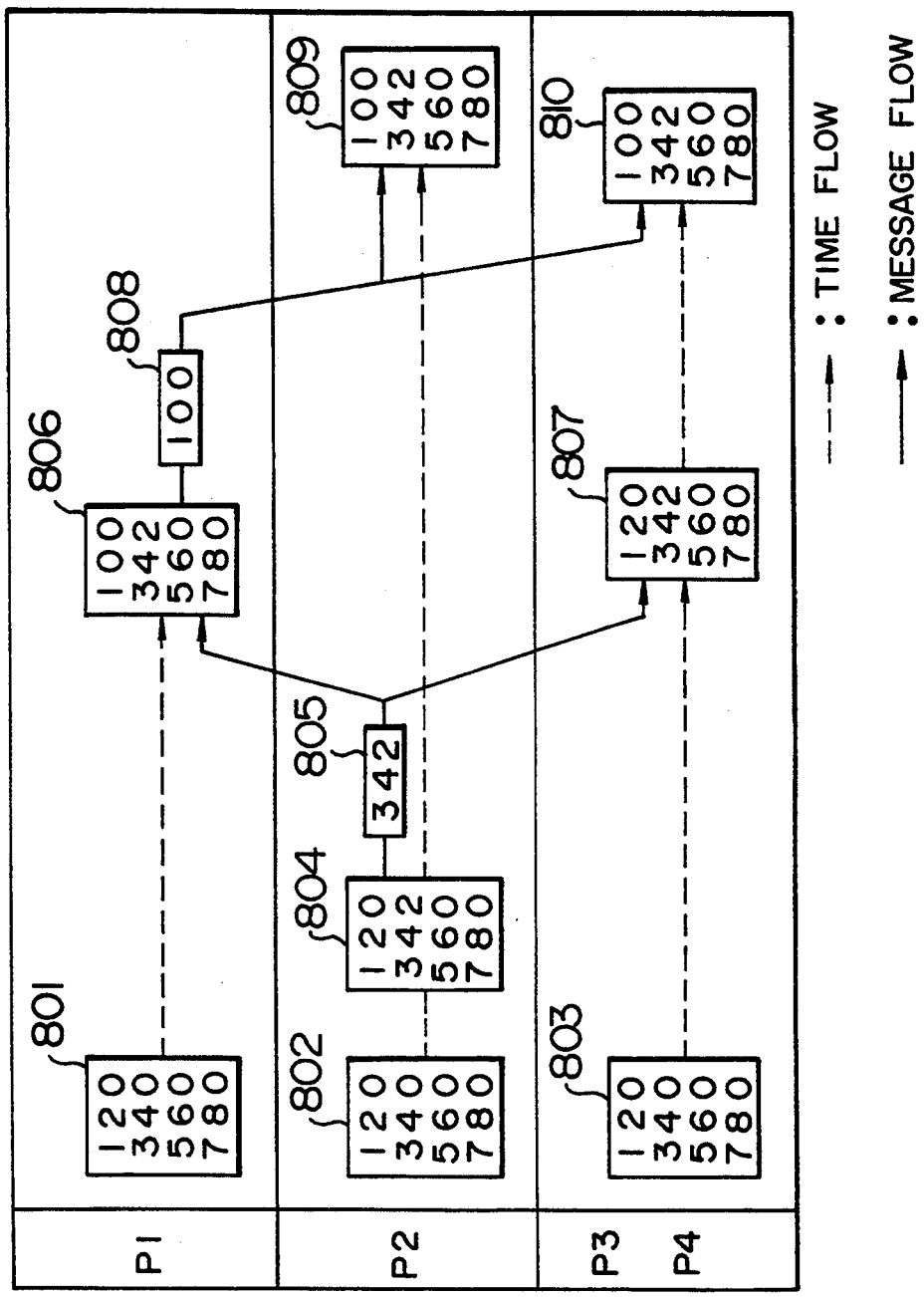

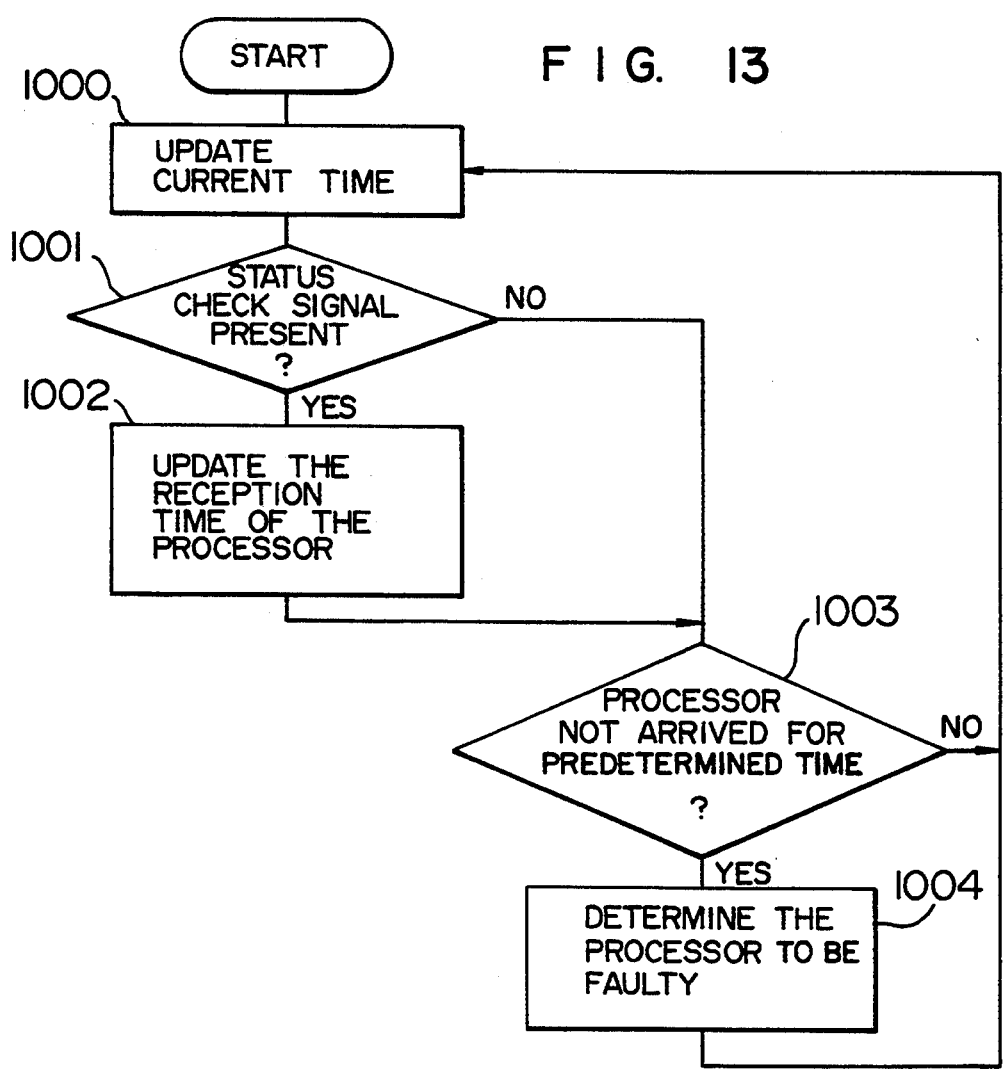

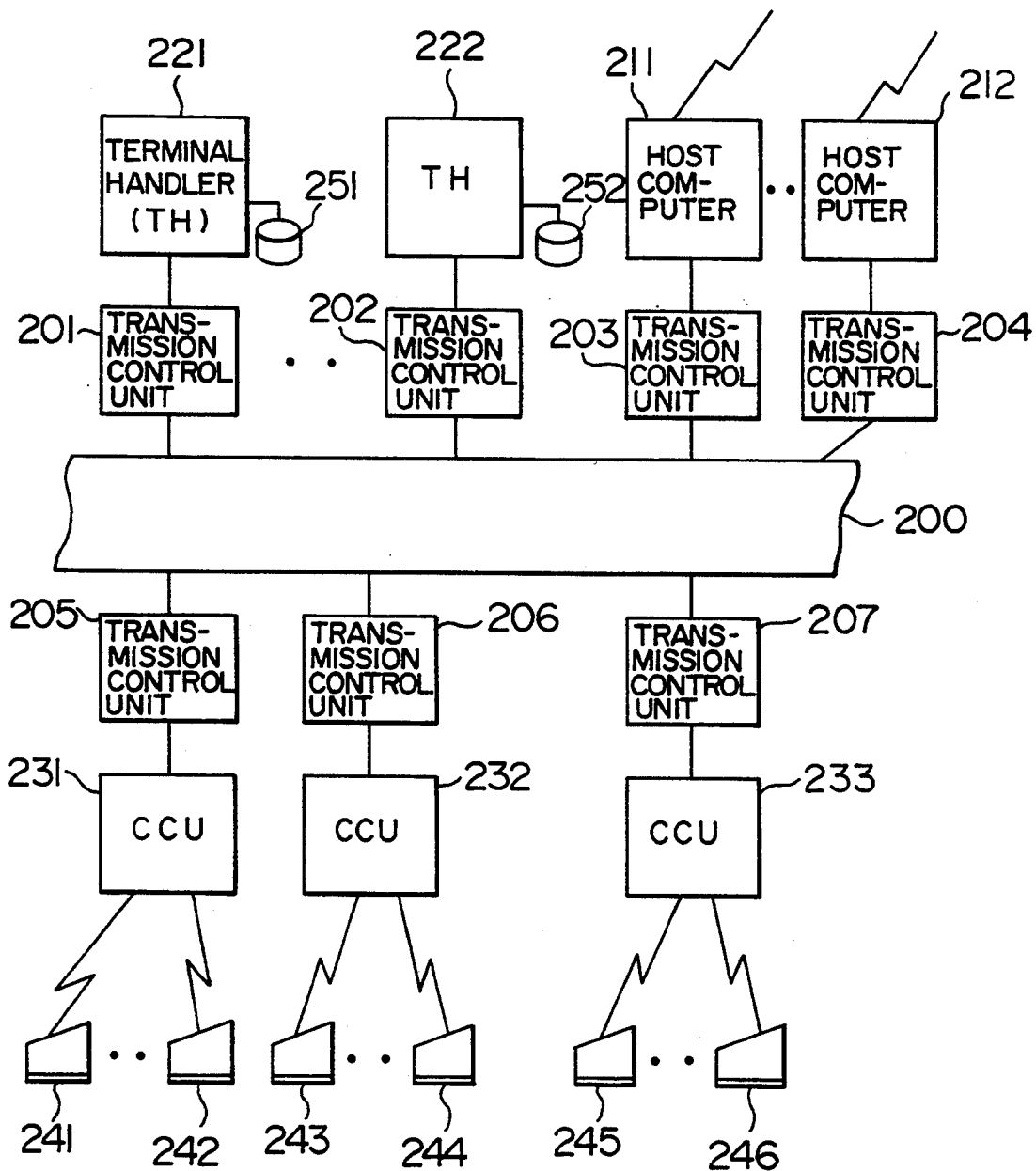

FIG. 15
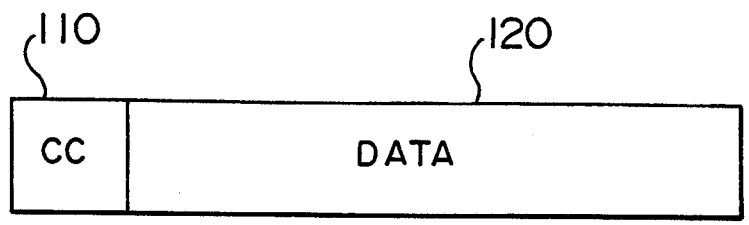
FIG. 16
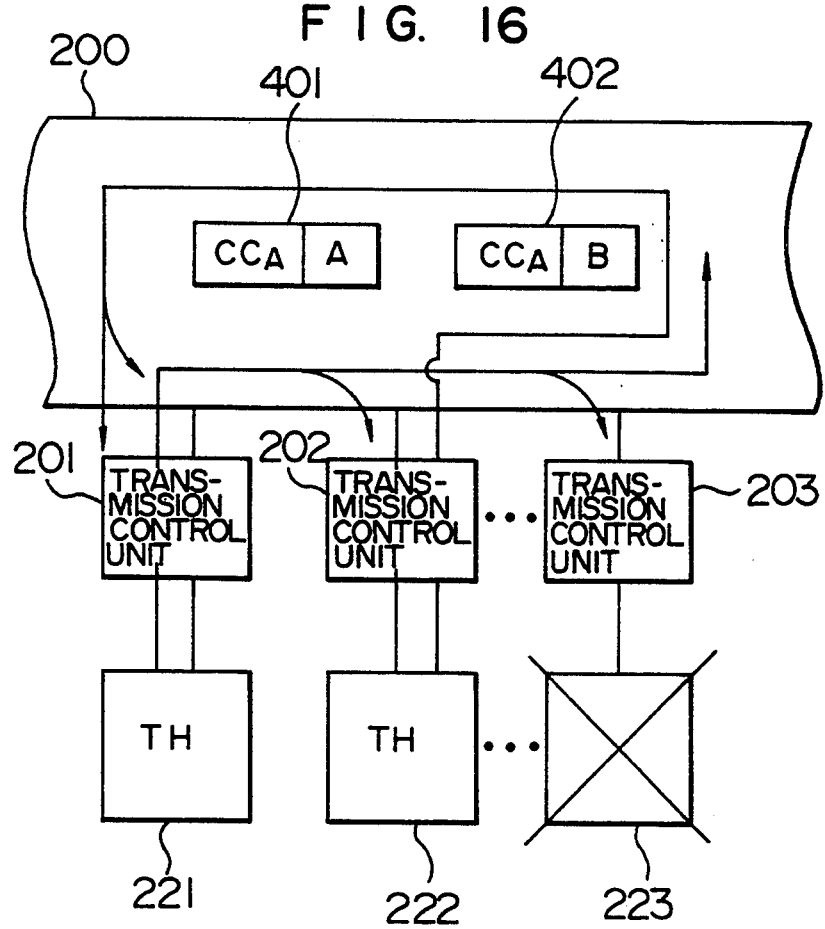
FIG. 17
| PROCESSOR IDENTIFIER | STATUS CHECK SIGNAL ARRIVAL TIME |
|---|---|
| d 2 | 6 : 42 |
| d 3 | 6 : 40 |

F I G. 22

| PROCESSOR IDENTIFIER | MANAGEMENT TERMINAL IDENTIFIER |
|---|---|
| 41 | 61 |
|  | 62 |
| 42 | 63 |
|  | 64 |
|  | 65 |
|  | 66 |

F I G. 23

| CPU | STATUS | RECEIVING INTERVAL COUNTER | PREVIOUS RECEIVING INTERVAL | THRESHOLD VALUE |
|---|---|---|---|---|
| d1 | — | 0 | — | 4 |
| d2 | — | 0 | — | 4 |
| d3 | — | 0 | — | 4 |
| d4 | — | 0 | — | 4 |

F I G. 24

| CPU NO. | STATUS | RECEIVING INTERVAL COUNTER | PREVIOUS RECEIVING INTERVAL | THRESHOLD VALUE |
|---|---|---|---|---|
| 1 | ALIVE→DEAD | 3 → 4 | 2 | 4 |
| 2 | — | 0 | — | 4 |
| 3 | ALIVE | 2 → 0 | 1 | 4 |
| 4 | — | 3 → 4 | — | 4 |

F I G. 25

| CONTENT CODE | CPU NUMBER WITH CHANGED STATUS | STATUS CHANGE KIND |
|---|---|---|

FIG. 28

| CPU NO. | STATUS | RECEIVING INTERVAL COUNTER | PREVIOUS RECEIVING INTERVAL | THRESHOLD VALUE |
|---|---|---|---|---|
| d1 | ALIVE | 3 → 0 | 1 → 3 | 4 → 5 |
| d2 | — | 0 | — | 4 |
| d3 | ALIVE | 2 | | 5 |
| d4 | ALIVE | 3 | 4 | 5 |

FIG. 29

| CPU NO. | STATUS | RECEIVING INTERVAL COUNTER | PREVIOUS RECEIVING INTERVAL | THRESHOLD VALUE |
|---|---|---|---|---|
| d1 | ALIVE | 2 | 2 | 5 |
| d2 | — | 0 | — | 4 |
| d3 | ALIVE | 1 → 0 | 3 → 1 | 4 → 3 |
| d4 | ALIVE | 3 | 3 | 5 |

FIG. 30

| CPU NO. | STATUS | RECEIVING INTERVAL COUNTER | PREVIOUS RECEIVING INTERVAL | THRESHOLD VALUE |
|---|---|---|---|---|
| d1 | ALIVE | 2 | 1 | 4 |
| d2 | — | 2 | 1 | 4 |
| d3 | ALIVE | 1 | 2 | 4 |
| d4 | ALIVE | 2 | 1 | 4 |
| d5 | ALIVE | 0 | — | 4 |

F I G. 31

| CONTENT CODE | SENDER ID | TRANSMISSION INTERVAL |
|---|---|---|

F I G. 32

| PROCESSOR NO. | STATUS | RECEIVING INTERVAL COUNTER | TRANSMISSION INTERVAL | THRESHOLD VALUE |
|---|---|---|---|---|
| d 1 | | | | |
| d 2 | | | | |
| d 3 | | | | |
| d 4 | | | | |

F I G. 35
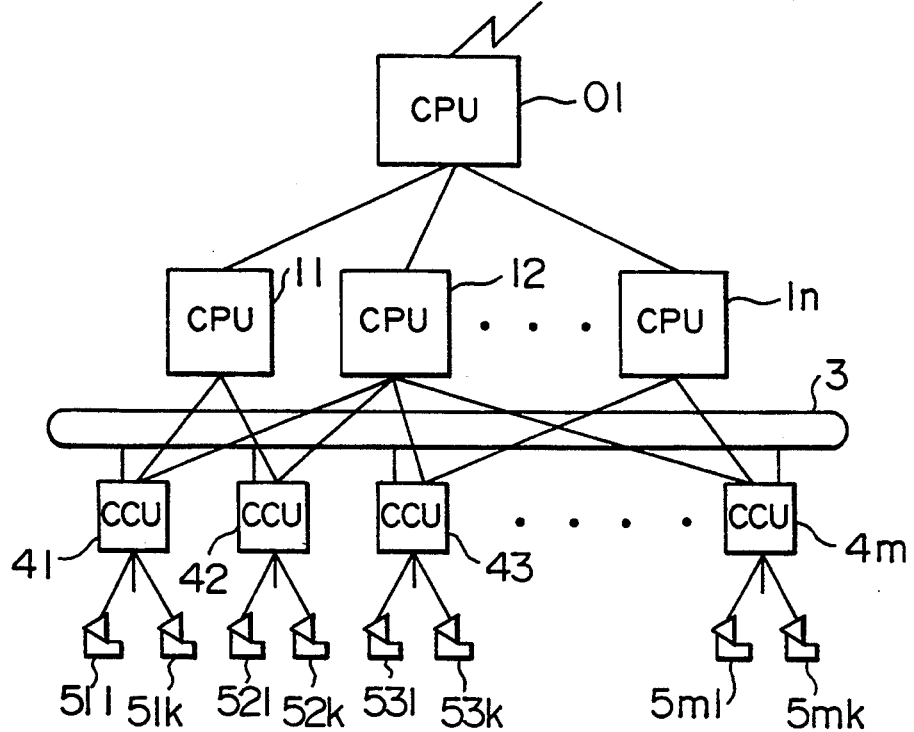
F I G. 36
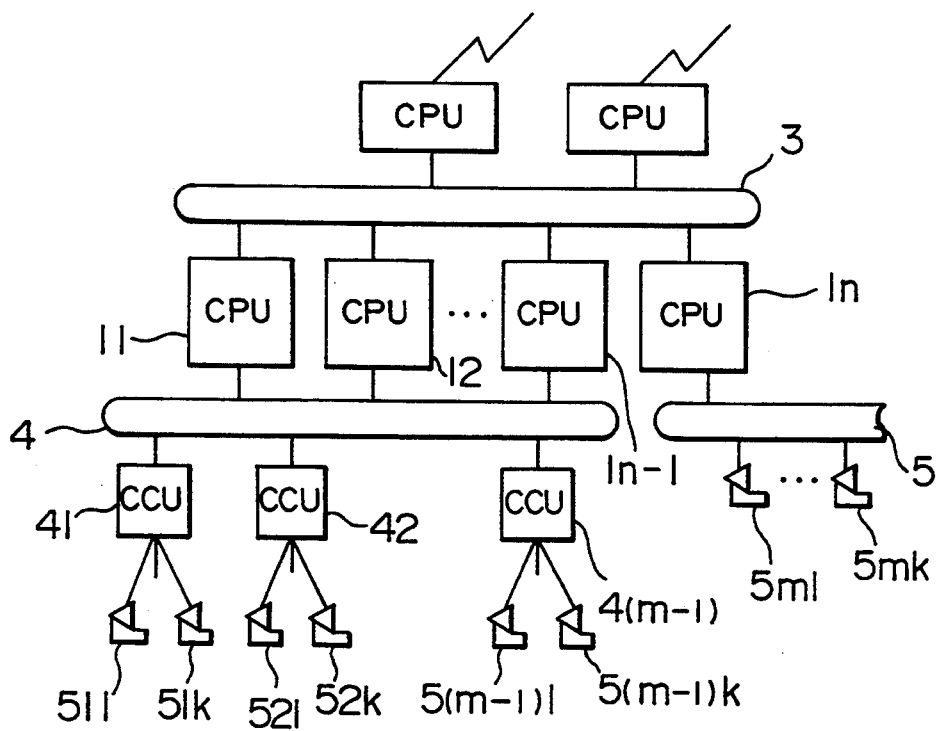

INFORMATION HANDLING METHOD AND SYSTEM UTILIZING MULTIPLE INTERCONNECTED PROCESSORS AND CONTROLLERS

BACKGROUND OF THE INVENTION

1. Field of the Invention

The present invention generally relates to information handling methods and systems based on a non-stop operating basis and, more particularly, to an information handling method and system which can increase the number of terminals that can be included in the system without stopping services to the terminals.

2. Description of the Related Art

As an on-line system is expanded, the number of terminals to be connected therein increases, and the processing load of a host computer increases. For the purpose of reducing the load to obtain a higher quality of service, there has been conventionally developed a distributed processing system which allows mutual usage of resources on a plurality of host computers through communication between the host computers.

In such a multi-computer system, in particular in an information handling system, terminals, computers for providing service to the terminals, and a host computer for collecting data from external devices outside the system have been connected in a vertical line to form a hierarchical structure. Communication between the elements in the same hierarchy has been carried out in a one-to-one correspondence relation through an element upward by one rank. An example of such prior art systems is shown in FIG. 2. The prior art system of FIG. 2 includes CPUs 01 and 11 to 1n, disc units 1 and 21 to 2n, terminal control units 41 to 4m, and terminals 511 to 5mk.

In order to enhance the reliability of such a system, conventionally, each pair of the system elements have been arranged on a multiplex or redundancy basis, and the elements have been handled in such pair-element units.

One such system is disclosed in, for example, literature entitled "Fault Tolerant System", written by Grey and translated by Eiichi Watanabe, MacGraw Hill K.K., 1986.

This prior art system, however, has had a problem in that communication between two elements in the system, in particular communication between two elements performing the same function, must be carried out through an upper-ranked element so that, when a fault occurs in the upper element or when the upper element is to be repaired or expanded, difficult communication between the lower elements results, thus disabling redundancy or take-over of the business. As related art, there are cited U.S. Pat. Nos. 4,366,479, 4,477,881 and 4,462,075 and a U.S. application Ser. No. 448,942 filed Dec. 12, 1989 entitled "Method and System For Information Distribution Services" (British Patent Application No. 8928106.5).

SUMMARY OF THE INVENTION

It is therefore an object of the present invention to provide an information handling method and system which can overcome the problem in the prior art and which can permit high system expansion and reduced maintenance.

In order to attain the above object, in accordance with one feature of the present invention, two or more of a plurality of host computers, a plurality of terminal handlers and terminal controllers (which will be referred to as the CCUs, hereinafter) are connected to a transmission medium, the respective element is connected to the transmission medium select their necessary data from data received over the transmission medium, process the necessary data and if necessary, send the processed results to the common transmission medium.

In accordance with another feature of the present invention, data sent onto the common transmission medium is provided with a content code indicative of the type of contents of the data, and each of the plurality of processors connected to the common transmission medium includes means for determining whether to receive the data or not on the basis of the content code of the data.

According to a further feature of the present invention, each of the plurality of processors comprises means for measuring the arrival time of content code data, having the data coupled with the content code, means for storing the arrival time, means for determining whether or not the content code data arrives at predetermined time intervals, and means, when sending the content code data regularly at the predetermined time intervals and failing to receive the content code data in a predetermined time (which will be referred to as threshold value, hereinafter), for judging that the processor computer is faulty.

In accordance with another feature of the present invention, when terminal handlers (which will be called THs, hereinafter) and CCUs are connected to a common transmission medium, terminals are set to be managed by each of the THs, and each of the THs sends data to the terminals under management and when detecting a fault in the other THs, also send data to terminals to be managed by the faulty TH.

In another feature of the present invention, each of the CCUs determines the necessity or non-necessity of the data received from the terminal handlers and outputs only data judged as necessary to the terminals connected to its own processor.

In a further feature of the present invention, each of the CCUs sets the terminals under management of the plurality of THs with respect to the respective THs on a multiplex basis. determines the necessity or non-necessity of multiplex data received from the plurality of THs, and outputs only data of the multiplex data determined to be necessary to the terminals.

In another feature of the present invention, when it is desired to register the type of data demanded by the terminal to the TH, the terminal attaches the content code and an identifier indicative of the terminal to the register data and sends the register data attached with the content code and identifier to the common transmission medium, and the TH having received the register data registers the data for the associated terminal identifier.

The present invention is also featured in that, when the TH sends edited and processed data on the basis of registered data, the TH attaches a terminal identifier of the registered data to the processed data and then outputs it, and the CCU determines one of the terminals desiring the data and outputs the data, on the basis of the identifier of the terminal, its CCU and the terminal identifier of the data.

In accordance with another aspect of the present invention there is provide an information handling method in a processing system, which method comprises, in the case where either THs alone or only two types of the THs and host computers for collecting data from external devices outside the system are connected to the common transmission medium, a first step of sending from its own TH to the common transmission medium data (I/O status) containing the identifiers of all CCUs to be managed by its own TH and connection status between the TH and the CCUs to be managed by the TH, a second step of collecting the data and diagnosing the connection status between the TH and CCUs, and a third step of, when the TH detects at the second step that a fault exists in connections between the other CCUs under management of the other THs or a fault exists in the other THs, putting the CCUs belonging to the faulty TH under management of its own TH.

In accordance with other features of the present invention, the threshold value is changed depending on the arrival time interval of the content code data.

In the present invention, since the respective elements connected to the transmission medium select and take in their necessary data received from the transmission medium, the respective elements can be freely communicated regardless of their roles in the system. In addition, the take-over of data generation between the respective elements and business redundancy can be realized on an on-line basis by means of the use of the transmission medium.

BRIEF DESCRIPTION OF THE DRAWINGS

FIG. 4 shows an exemplary terminal management table;

FIG. 5 shows an exemplary CCU assignment table;

FIG. 6 shows an exemplary CCU connection table;

FIG. 7 shows an exemplary I/O status table;

FIG. 8 shows an exemplary format of an I/O information message;

FIG. 9 shows an exemplary format of a fault information message;

FIG. 10 is a diagram useful for explaining how the CCU connection tables of respective processors are updated by messages when the CCU connection is changed;

FIG. 11 shows an exemplary format of a serial number table;

FIG. 12 shows an exemplary format of the I/O information message when attached with a serial number;

FIG. 13 is a flowchart useful for explaining how to monitor the alive/dead status of the processor;

FIG. 14 depicts an arrangement of an information handling system in accordance with another embodiment of the present invention;

FIG. 15 shows an exemplary format of a message;

FIG. 16 is a diagram showing the flow of messages in a mutual monitor mode between the processors;

FIG. 17 depicts an exemplary format of a mutual monitor table;

FIG. 22 shows an exemplary format of a configuration table;

FIG. 23 shows an exemplary format of a monitor information table in a further embodiment of the present invention;

FIG. 24 shows how the monitor information table is modified in response to reception of the status check signal of its own processor;

FIG. 25 shows an exemplary format of a status change message;

FIGS. 28 and 29 are monitor information tables when updated at the time of receiving the status check signal of the other processor;

FIG. 30 shows a monitor information table when a new processor is added in the system;

FIG. 31 shows an exemplary format of a status check signal in another embodiment of the present invention;

FIG. 32 shows a monitor information table in the same embodiment of the present invention;

FIGS. 34 to 36 show arrangements of information handling systems in accordance with different further embodiments of the present invention.

DESCRIPTION OF THE PREFERRED EMBODIMENTS

An embodiment of the present invention will be detailed by referring to the attached drawings.

1. System Configuration

Figure 1A:
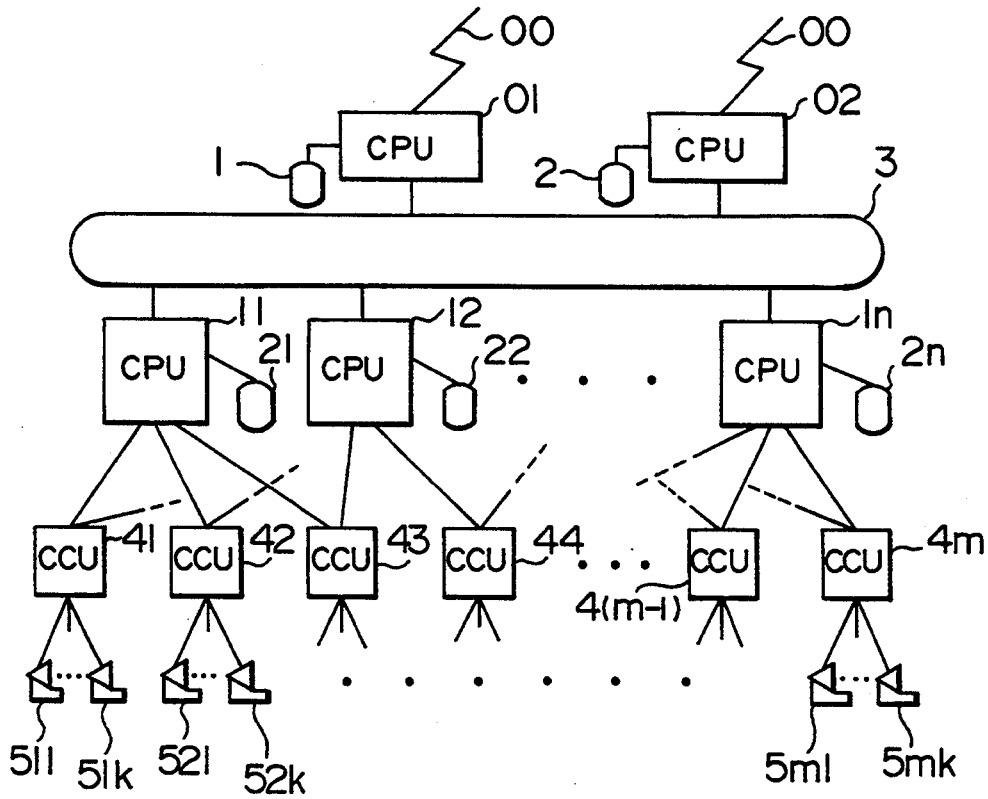
FIGS. 1A to 1G show an arrangement of an information handling system in accordance with an embodiment of the present invention, also showing the flow of data in different businesses or transactions.

FIG. 1A shows a general arrangement of an information handling system, embodying the present invention which includes central processing units (which will be referred to as CPUs, hereinafter) 01, 02, and 11 to 1n, the CPUs 01 and 02 being connected to external devices through lines 00. The computers 01, 02, and 11 to 1n are also connected to a common transmission medium 3. The system is embodied in the form of a link type network in the illustrated embodiment, but the system may be embodied in the form of a bus type network or a 1:1 connection network of perfect graph structure. The system also includes terminals 511 to 5mk and communication control units (which will be referred to as the CCUs, hereinafter) 41 to 4m for controlling communications between the terminals 511 to 5mk and the CPUs 11 TO 1n. The CCUs have respectively two more communication ports connectable with mutually different CPUs. The terminals 511 to 5mk are connected to any of the CCUs 41 to 4m to receive service from any of the CPUs 11 to 1n through the CCUs. The CPUs 11 to 1n have discs (which will be referred to as DISKs, hereinafter) 21 to 2n respectively; while the CPUs 01 to 02 have DISKs 1 and 2 respectively.

The DISKs 1 and 2 contain change histories of on-line data (which will be referred as to the history data, hereinafter) received from the lines 00. Stored in the DISKs 21 to 2n are the latest values of on-line data (which will be referred to as the current data, hereinafter). Such accumulatable data include, for example, the present value of stock on the stock market.

2. Normal Operation

The transactions of the present system are divided into four i.e., (1) automatic updating of user terminal screen based on data received from a line, (2) registering of a data item to be automatically updated from a user terminal, (3) inquiring of current data from a user terminal, and (4) inquiring of history data from a user terminal. The operation of the system with respect to these transactions will be explained. However, prior to the explanation of the system operation, several terms to be used herein will first be defined.

The CCU physically connected to the line is called the "assignable CCU". To apply a connection interrupt to the assignable CCU to open a logical line and make it serviceable is referred to merely as "connect". The valid one of the communication ports of each CCU is determined by using the latest message. For example, when two CPUs are trying to be connected to one CCU at nearly the same time, the hardware of the CCU is arranged so that one of the two CPUs is connected.

Further, the CCU which is connected with the CPU to be serviceable (which is not occupied by other CPUs) is called the "CCU assigned" by the associated CPU. When the entire system is normal, the CCUs occupied by the respective CPUs are referred to as the "dedicated CCUs".

The CPUs 11 to 1n have respectively a "terminal management table" indicating data items which are being displayed by their own assignable terminals (terminals belonging no their own assignable CCU). An exemplary format of such a terminal management table is shown in FIG. 4.

Figure 1B:
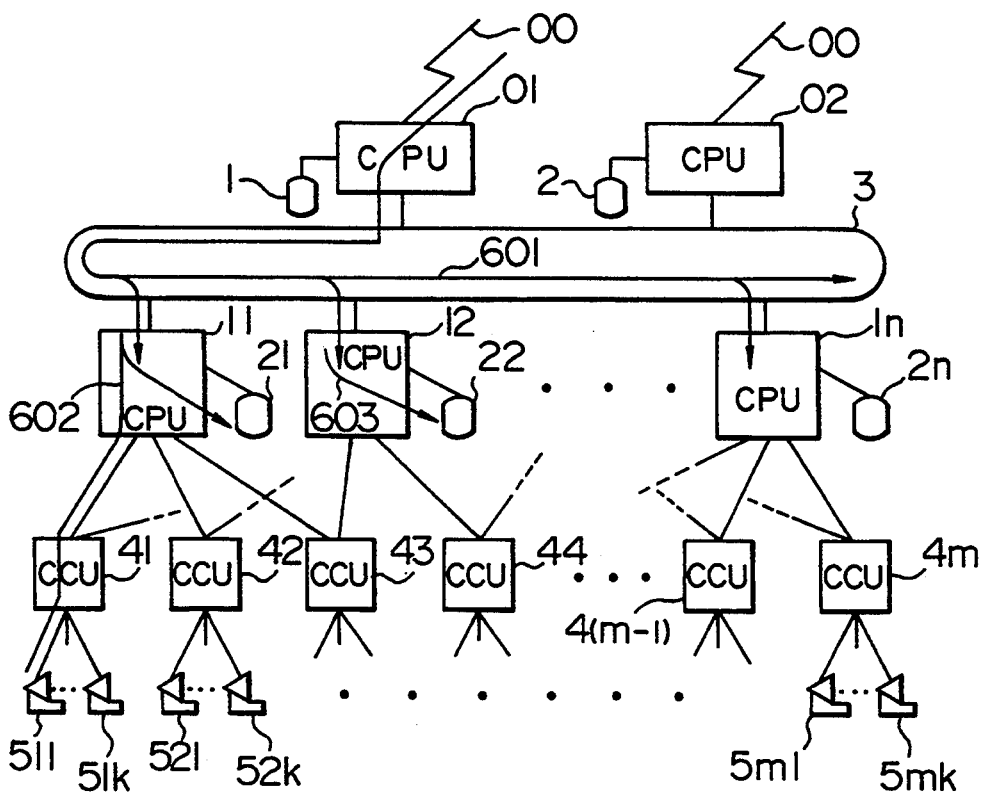

(1) The procedure for automatic updating will be explained below with reference to FIG. 1B. First, the CPU 01, when receiving on-line data from the line 00, stores the received data in the DISK 1 and also broadcasts the same data to the CPUs 11 to 1n through the common transmission medium 3. The flow of the data at this time is denoted by an arrow 601 in FIG. 1B. Then, the CPUs 11 to 1n, when receiving the data, update the current data of the DISKs 21 to 2n connected thereto, make reference to their terminal management tables, and update the display screen of one of the terminals now displaying the associated data through the "assigned CCUs" of their own CPUs. For example, when the received data corresponds to the on-line data on "the present stock value of company X", the associated CPU updates the display screen of one of the terminals now displaying the stock value of company X. An arrow 602 in FIG. 1B denotes the then data flow from the CPU 11 when the CCU 41 is the "assigned CCU" of the CPU 11 and only the terminal 511 is displaying the data associated with the received data. An arrow 603 denotes the data flow from the CPU 12 when any of the terminals connected to the "assigned CCUs" of the CPU 12 is not displaying the associated data.

Figure 1C:
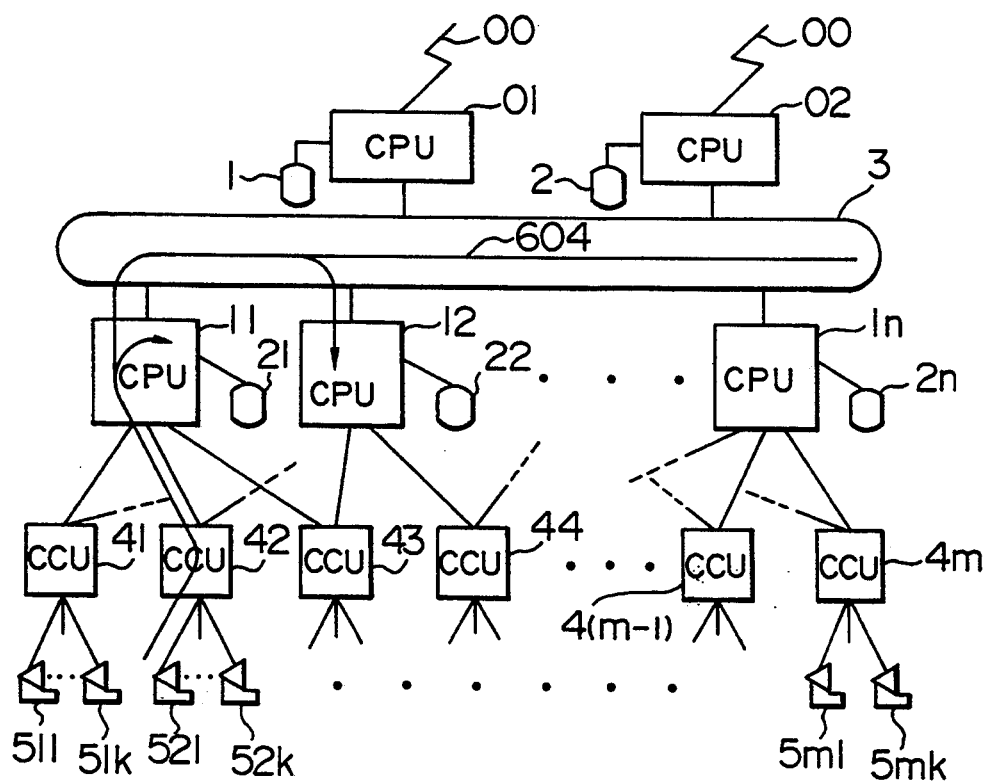

(2) The procedure of registering a data item to be automatically updated will be explained below by referring to FIG. 1C. When the terminal 521 inputs a new item name, the terminal transmits the text through the CCU 42 to the CPU (11 in the illustrated example) belonging thereto. The CPU 11, when receiving the text from the CCU 42, updates its own terminal management table and then broadcasts the text to the transmission medium 3. When one of the other CPUs 11 to in receiving the text has the input origination terminal 521 as its assignable terminal, the associated CPU updates its own terminal management table; otherwise, the other CPUs discard the text. An arrow 604 denotes the flow of the registration text when the two CPUs 11 and 12 can assign the terminal 521.

Figure 1D:
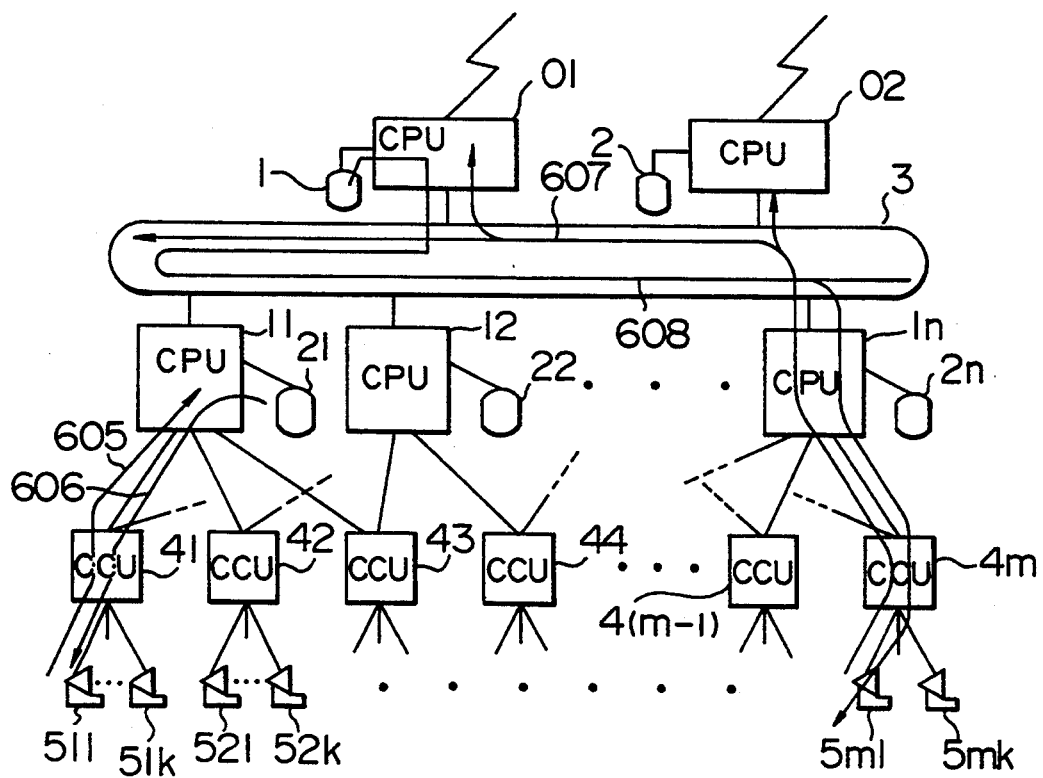

(3) The procedure of inquiring as to the current information will be explained in connection with FIG. 1D. Assume now that the CCU 41 is the "assigned CCU" of the CPU 11 and a current information inquiry text is issued from the terminal 511 as an example. Then the text issued from the terminal 511 is sent through the CCU 41 to the CPU 11 to be received therein. The CPU 11, when receiving the text and determining that the text is a current information inquiry, edits response display screen data according to the contents of the DISK 21 and sends the edited screen data to the terminal 511 through the CCU 41. The then flow of the inquiry text is denoted by an arrow 605, and the flow the response display screen data is denoted by an arrow 606.

(4) The procedure of inquiring as to the history data will be explained by referring to FIG. 1D. Explanation will be made, as an example, in connection with a case where the CCU 4m belongs to the assigned CPU 1n and a history data inquiry text is issued from the terminal 5m1. In this case, the history inquiry text is sent through the CCU 4m to the CPU 1n to be received therein. When the CPU in determines that the received text is a history data inquiry, the CPU in transmits the text to the CPU 01. The CPU 01, when receiving the text from the CPU 1n, edits response display screen data by making reference to the contents of the DISK 1 and then transmits the edited screen data to the CPU 1n. The CPU 1n, when receiving the response screen data from the CPU 01, sends the received data to the terminal 5m1 through the CCU 4m. The then flow of the inquiry text is denoted by an arrow 607, and them flow of the response screen data is denoted by an arrow 608.

3. Configuration Control

Explanation will be made as to the configuration control function when a fault takes place in the CPUs 11 to 1n. Fox simplification of explanation, explanation will be made under a condition that n=4 and m=8, where n and m are as defined in FIG. 1A. Prior to starting of the explanation, several terms and tables will be defined.

A CCU, which is an assignable CCU but not a dedicated CCU, is called a "backup CCU". Assume that the dedicated CCUs and backup CCUs are assigned to the respective CPUs so that any of the CCUs is assigned to one CPU as its own dedicated CCU and also Is assigned to one or more CPUs as a backup CCU. For example, assume that the assignment of the dedicated and backup CCUs is set as shown in FIG. 5. A table for storing such data is referred to as "the CCU assignment table," and each of the CPUs has such a table. However, it is unnecessary for each CPU to have the entire table, and it is sufficient for each CPU to have merely the lines of the table corresponding to its own CPU number.

Each CPU, in addition to the above CCU assignment table, also holds therein a table called a "CCU connection table" showing connection relationships between all the CPUs and the CCUs connected (or assigned)

thereto. An exemplary format of such table is shown in FIG. 6 wherein reference symbol B-EXP is an abbreviation of bus-expander, which is a device provided to each of the CPUs for connection between the CPU and the associated CCUs. Although the number of such bus expanders has been set to three in the present embodiment, the bus expander number may be set to be larger than three, so long as the number does not exceed the number of assignable CCUs (4 in the illustrated embodiment). In FIG. 6, "0" means that the B-EXP of the CPU is not connected.

In addition, each CPU has an "I/O status table" listing the I/O status of all the CPUs, for example the normal and abnormal status of 10 of the disc units (FX/D) and bus expanders (B-EXPs). The exemplary format is shown in FIG. 7 wherein the I/O data are omitted.

4. Configuration Control Software Structure and Operation

The software management of configuration control in the present system is carried out on a data drive basis. More specifically, data which each CPU outputs to the network is attached with a content code, indicative of the type of contents of the output data, and is broadcast to the transmission medium 3 as a message. The respective CPUs 11 to 1n determine the message on the basis of its content code, and if the data of the message is necessary to execute their own program, then accept the message to execute the processing, and otherwise refuse to accept the message. For details of the protocol of the software management, refer to JP-A-57-146361 and JP-A-62-42260.

Explanation will next be made as to three program modules on the configuration control provided in each CPU. The three program modules are the same as those in each CPU.

(1) I/O Status Detection Module

The present module sends to the network, as an "I/O information message", data associated with its own CPU both in the CCU connection table and in the I/O status table, only when a not shown subsystem (which will be referred to as the connection control subsystem, hereinafter) for controlling the connection to the CCUs or a diagnosing module to be explained later causes the updating of the line data of the CCU connection and I/O status tables corresponding to its own CPU. FIG. 8 shows an exemplary format of the I/O information data, in which reference symbol CC1 denotes content code, SA denotes the ID code of a sender CPU (which will be referred to as P1 to P4, hereinafter), and B-EXP1 to B-EXP3 denote the I/O status of its own CPU. In this connection, the full message is not required, but only information of the updated parts may be sufficient. When it is desired to output a message only at the update time, for example the module itself may be executed at constant-period intervals so that only when the module compares the contents of the two tables with the values at the time of the previous execution of the module and detects a change in the contents, then the module outputs the message. Alternatively, another module, which has carried out its updating operation, may be executed. In the present embodiment, the former is employed.

(2) I/O Diagnosing Module

Figure 3A:
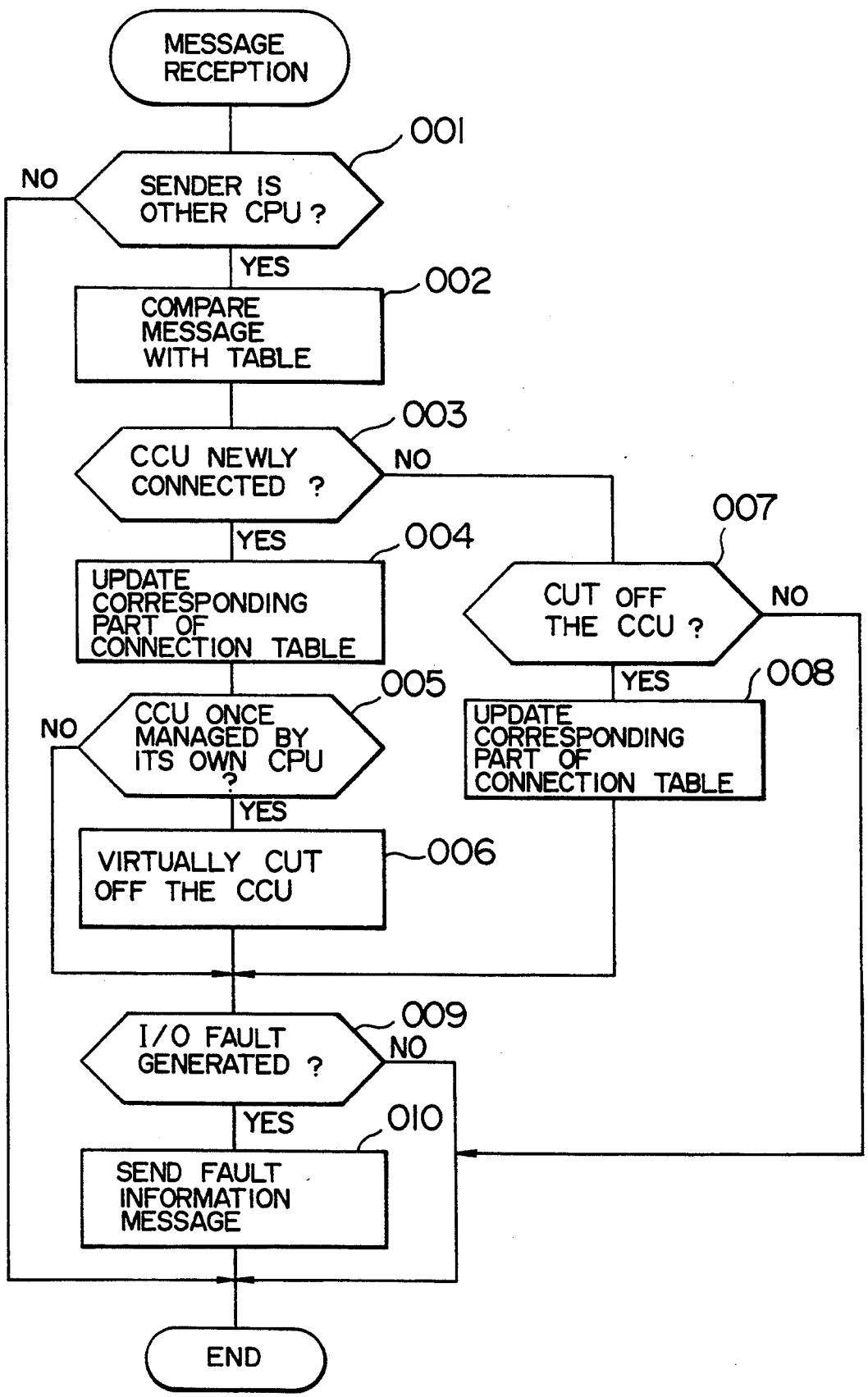
FIGS. 3A and 3B are flowcharts for explaining the control operation of the system.

The present module is executed by the output message of the I/O status detection module (1) to update the tables on the basis of the contents of the message and to output a message at the time of trouble. The operation of the present module will be described in accordance with a flowchart of FIG. 3A.

More in detail, when the received message is one issued from its own CPU (step 001), no processing is carried out, and the module ends its operation. If the received message is one issued from another CPU, then the module compares the contents of the received message with a line of the CCU connection table corresponding to the message sender CPU (which will be referred to merely as the sender, hereinafter) to determine whether or not there is a difference therebetween (step 002). And when the change means that a new CCU is connected to the B-EXP of the sender, which has been empty until now (step 003), the module updates the corresponding line in the CCU connection table (step 004). When the new CCU has been assigned until now by its own CPU (step 005), the module clears to 0 the CCU number written on the line of the CCU connection table corresponding to its own CPU (step 006). This is hereinafter referred to as virtual cut-off. When a change indicated by the message means the cut-off of the CCU by the sender (step 007), the module correspondingly updates the CCU connection table (step 008). When the condition of both steps 003 and 007 are not satisfied, the module regards the message as invalid and terminates its operation without carrying out any processing. Next, when the module compares the contents of the message with the I/O status table and determines that an I/O fault takes place (step 009), the module outputs a fault information message attached with the contents of the occurred fault and with the number of the CCU connected to the CPU (both obtained from the received message) after updating of the I/O status table based on the message contents (step 010). The exemplary format is shown in FIG. 9, in which a reference symbol CC2 denotes a content code, SA denotes its own CPU number, ENO denotes the ID of a faulty CPU, EC denotes the contents of the fault (such as a disc fault, a bus/expander fault, or the like), and B-EXP1 to B-EXP3 denote the numbers of CCUs connected to the faulty CPU, respectively. In addition, reference symbols MY-EXP1 to MY-EXP3 denote the numbers of CCUs connected to its own CPU.

Further, since only the module of its own CPU uses the data of the present message, it is unnecessary to send the message to the network, and it is only required to transfer the message data to the module of its own CPU to execute the module.

(3) Configuration Management Module

Figure 3B:
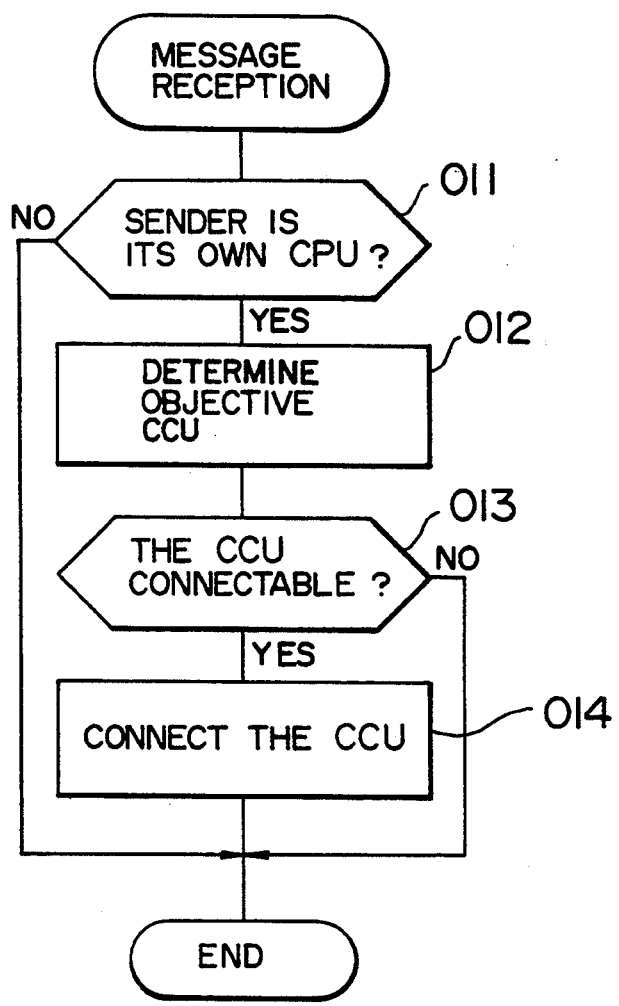

The present module is executed by a fault information message. The operation of the module will be explained below by referring to FIG. 3B.

First, when the sender of the message is not its own CPU (step 011), the module performs no operation. When the fault information message is not sent to the network, the step 011 is unnecessary. If the message sender is its own CPU, then the module determines CCUs to be backed up (which are also called objective CCUs) according to the contents of the message (step 012). For example, when all services are disabled due to a faulty disc of the CPU, all the CCUs written in B-EXP1 to B-EXP3 correspond to the objective CCUs. In the case of a bus/expander fault, only the CCU connected through the corresponding bus/expander corresponds to the objective CCU.

The module next checks, by making reference to the CCU assignment table, whether or not the objective CCUs are assignable by its own CPU and also connectable (that is, the bus/expander is empty) (step 013). If so, then the module starts the connection control to connect the CCU (step 014). When the connection of the CCU is successful, the connection control causes the updating of only one line of the CCU connection table corresponding to its own CPU. In other words, the appearance of CCUs overlapped in the entire CCU connection table is allowed.

5. Exemplary Diagnosing Operation

Figure 1E:
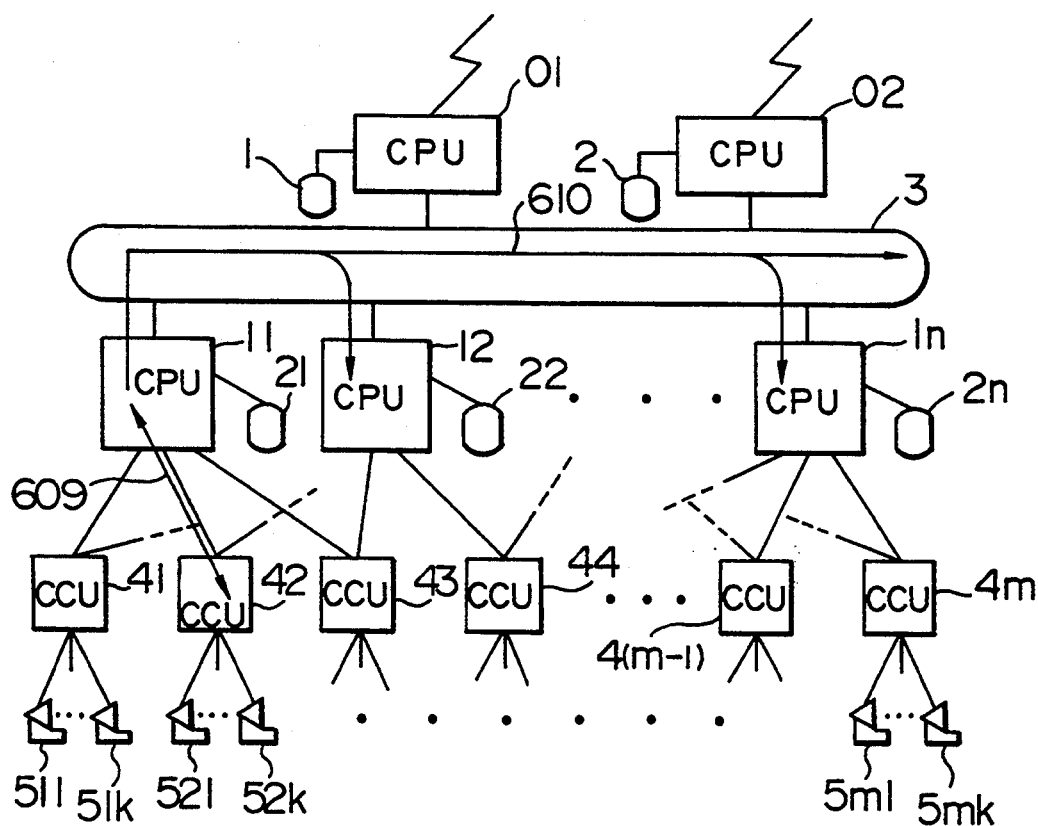
Figure 1F:
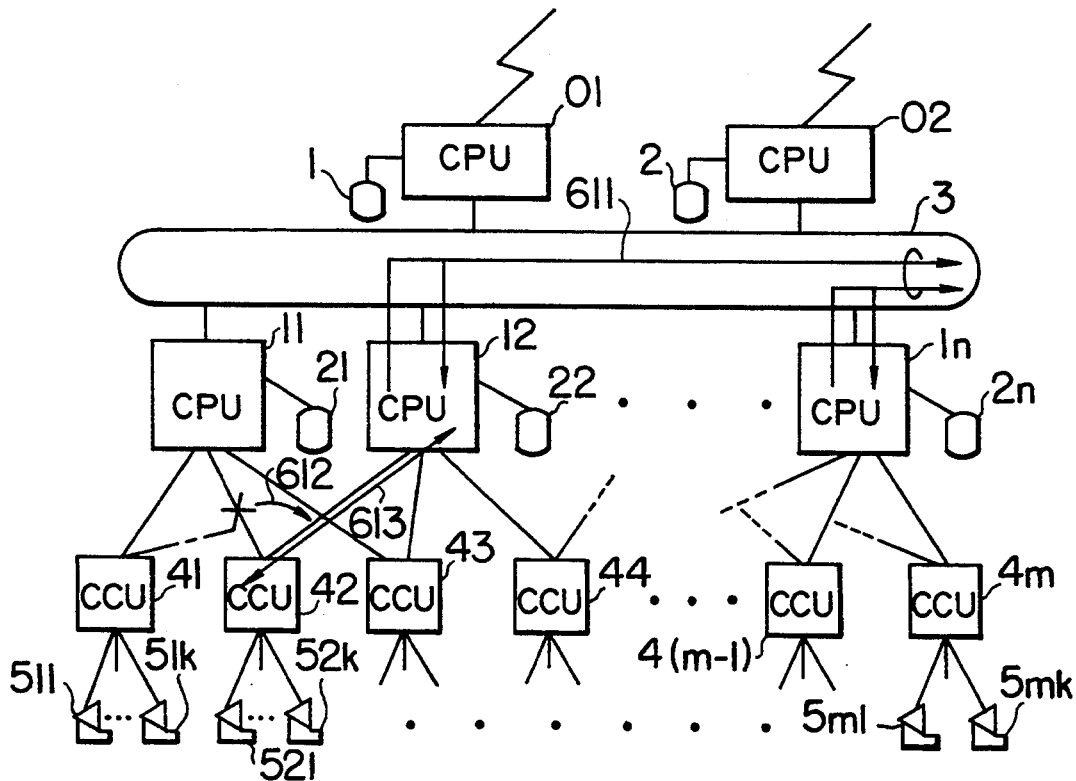

The diagnosing operation will be explained with reference to FIGS. 1E and 1F in connection with an example in which a fault takes place in the bus/expander No. 2 of the CPU 11 (p1) under conditions that n=4 and m=8, where n and m are as defined in FIG. 1A.

The CCU 42 in its initial state is connected to the CPU 11, at which time the flow of the services between the CPU and CCU is shown by an arrow 609. When a fault occurs, the I/O status detection module of the CPU 11 (P1) sends detection data (as shown by an arrow 610 in FIG. 1E) to the CPUs 12 to 14 (P2 to P4). The I/O diagnosing modules of the CPUs 12 to 14, when receiving the detection data from the CPU 11, send their diagnosis result messages indicative of the fact that the fault occurred (as shown by arrows 611 in FIG. 1F). Then the configuration management modules of the CPUs 12 to 14 (P2 to P4) are activated by the respective diagnosis messages issued from their own CPUs to know that the objective CCU is the CCU 42 which is connected to the CPU 11 (P1) through the bus/expander B-EXP 2. In this case, it is determined that the CCU 42 can be connected only to the CPU 12 (P2), and thus the CCU 42 is connected to the CPU 12. The connecting operation by the CPU 12 (P2) is shown by an arrow 612 and the resultant connected relationship is shown by an arrow 613.

The procedure, according to which the results reflect on the CCU connection tables of the respective CPUs, will be explained by referring to FIG. 10. The initial states of the connection tables of the CPUs P1, P2, and P3 (P4) are as shown by reference symbols 801 to 803. During the connecting operation, the table of the CPU P2 is changed from 802 to 804, at which time the connection CCU data and flow of the issued I/O information message are denoted by reference symbol 805.

Next, the diagnosing modules of the CPUs P1, P3 and P4, when receiving the detection message, update their CCU connection tables. In particular, the CPU P1 performs its virtual cutting-off operation of the CCU 42. The CCU connection tables of the CPUs P1 and P3 or P4 subjected to the updating operation are denoted by 806 and 807. CPU P1, after having performed the virtual cutting-off operation, again sends an I/O information message, the contents and flow of which are shown by a numeral 808. The CPUs P1 to P4, when receiving the I/O information message from the CPU P1, update their tables into the same table as the CPU P1 (denoted by numerals 809 and 810). Even when two or more CPUs use the CCU 42 as their backup CCU, the latest message has priority in the connection of the CPUs to the CCU 42 as mentioned above, and thus the later connected state becomes valid and the table is correspondingly updated.

6. Effects of the First Embodiment

As has been disclosed in the foregoing, in accordance with the present embodiment, the current data are stored, the function of managing the display screen of a terminal is divided and distributed to a plurality of processors, and the processors are connected to the common transmission medium. As a result, the present embodiment can flexibly cope with a situation where the size of the system is increased and correspondingly the terminal data amount of on-line data amount is increased, and thus the host computer and TH can be expanded on an on-line basis. The configuration control of the plurality of processors is carried out, not by managing information on connections between the CPUs and CCUs and information on the I/O status under control of a single computer or on a common memory, but by broadcasting the information to the network and by uniquely collecting and diagnosing the messages by the respective CPUs. Thus, the diagnosis of I/O status of the respective CPUs can be advantageously reliably carried out. Further, since the connection to the CCU is determined on the latest message priority basis, and the need for checking the reservation of the faulty CPU prior to the connection of the CCU for successive processing of the other CPUs is eliminated, synchronization requirement can be removed, and triple or more backup of service to the CCU can be easily provided advantageously.

7. Other Embodiments (1) Second Embodiment

In the above first embodiment, the I/O information message has been output only when its own I/O status is changed. On the other hand, the message may be periodically sent regardless of the presence or absence of such change in the I/O data. In the latter case, the function of the I/O status detection module alone is changed, and the functions of the other modules are not modified. The second embodiment is advantageous in that, in addition to the effects of the first embodiment, periodically issued I/O information messages can be used as CPU status check signals to diagnose the other CPUs (including a full step fault). This CPU status check function will be detailed in the sixth embodiment, to be explained later.

(2) Third Embodiment

In the first and second embodiments, the messages issued from the respective CPUs are not always received in the message issuance order. That is, no consideration is paid to the possibility that the later issued message may be received sooner than the earlier issued message. As one means of solving this problem, it is considered that the respective CPUs attach such information as a serial number, transmission time and so on to their I/O information messages at the time of transmitting he messages. This will be explained as the third embodiment.

First, the respective CPUs have respectively a serial number table held therein. Shown in FIG. 11 is an example of such a serial number table having a format and contents. The initial values of lines of all the CPUs at the time of starting the system are all 0s. The I/O information message is as shown in FIG. 12. A difference between the present embodiment and the first embodiment is that a serial number MC is attached to the message at the time of transmission of the message. Explanation will be made below as to the operation of the present embodiment different from that of the first embodiment.

The I/O status detection module in the present embodiment is different from that of the first embodiment in that (1) the value on one of the lines of the serial number table corresponding to its own CPU is increased by 1, and (2) the resultant serial number is attached to the message prior to the transmission of the message.

The I/O diagnosing module in the present embodiment is different from that of the first embodiment in the following respects. After a check is made that the sender is not its own CPU in step 001 (FIG. 3A), the serial number of the message is compared with the serial number table. Only when the serial number of the message is larger than the number written on the line corresponding to the sender in the serial number table, the module updates the serial number table with use of the serial number of the message and goes to the step 002. Otherwise, the module terminates its processing.

The configuration management module of the present embodiment is the same as that of the first embodiment.

The third embodiment has such a feature, in addition to the effects of the first embodiment, that, even when the I/O status of one CPU is continuously changed and the message based on the first status change is received at another CPU later than the message based on the second status change (which will be sometimes called the message outrun, hereinafter), the former message will not be canceled by the latter message. That is, erroneous diagnosis cause by the so-called message outrun can be prevented.

The serial number in the third embodiment may be a time, based on an internal clock provided within each CPU. In this case, the name "serial number table" is changed to the name "transmission time table," and the other respects are not modified. The "transmission time" is based on the internal clock of the sender and is independent of the internal clock of the CPU to be diagnosed (3) Fourth Embodiment In the first, second and third embodiments, the module for sending the I/O information message and the module for receiving the message have used the common updating table. However, a table to be referenced by the sender module may be separately provided. That is, a table corresponding to one of the lines of the CCU connection table associated with its own CPU may be separately provided. The present embodiment is featured in that the need of the I/O diagnosing module to check the sender of the message can be eliminated, and thus the operation can be simplified.

(4) Fifth Embodiment (For System Expansion)

Figure 1G:
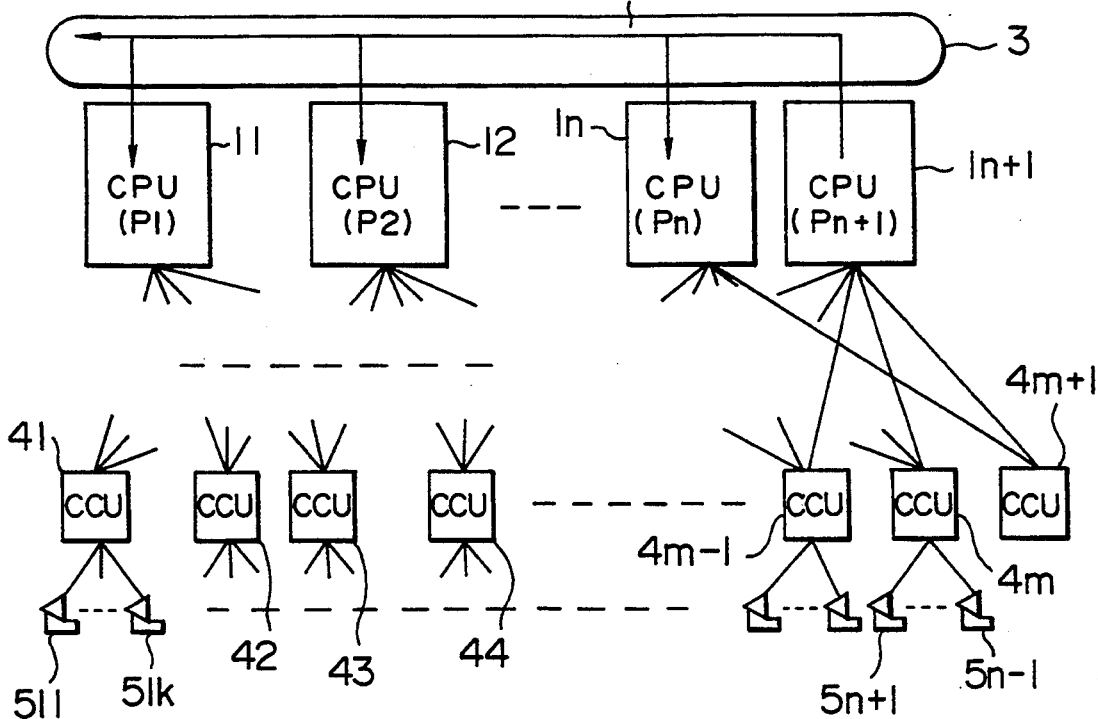
Figure 2:
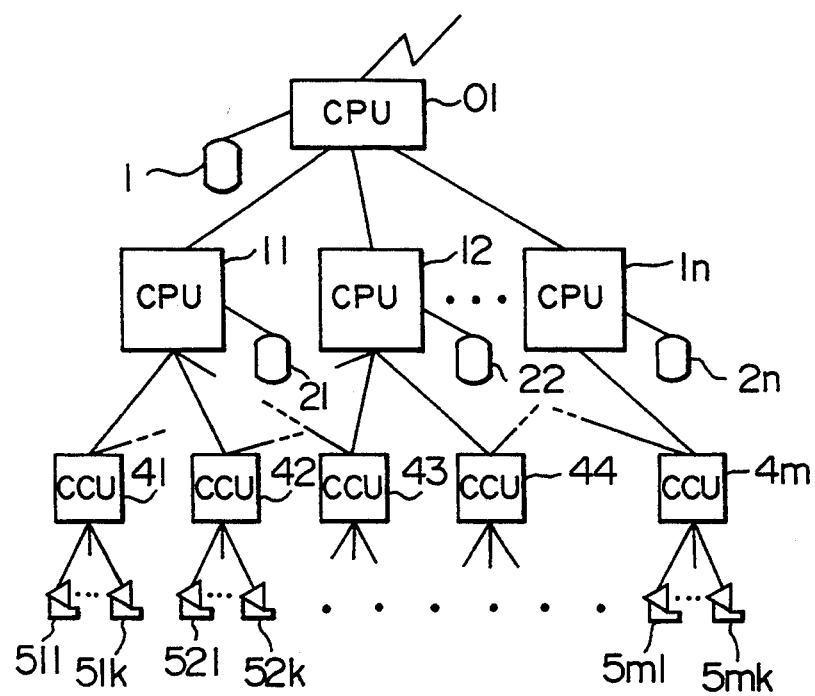
FIG. 2 depicts an arrangement of a prior art information handling system.

In the foregoing embodiments, the number of CPUs has been fixed to be n. However, the present invention can be effectively applied even in a case in which the number of CPUs and the number of CCUs are to be increased on an on-line basis. This will be explained as a fifth embodiment below. FIG. 1G shows an arrangement of a system in which the (n+1)-th CPU (Pn+1) connected with the (m+1)-th CCU 4m+1 is additionally provided. However, the CPU 00 and DISK are omitted in the drawing. In this case, it is necessary to previously record in its auxiliary memory the meaning of the number of the physically connected CCU prior to the activation of the CPU Pn+1. In the illustrated example, the CPU Pn+1 may be connected with the CCUs 4m−1, 4m and 4m+1, among which the CCU 4m+1 is a dedicated or exclusive CCU. Assume that the CCU 4m+1 is to back up the CPU 1n (Pn).

The procedure of system expansion is as follows. First of all, the CCU 4m+1 is registered as a backup CCU in the assignment table of the CPU Pn and then physically connected with the CCU 4m+1. In this connection, it goes without saying that the CPU Pn has extra communication ports for a bus/expander and CCU. If necessary, the CPU Pn may be stopped without breaking the continuity of service. Then, when the CPU Pn+1 is activated, this CPU is connected to the dedicated CCU and broadcasts its own configuration data (such as its own CPU number, the number of the CCU connected to the CPU, and so on) to the network. The flow of such configuration data is show by an arrow 614 in FIG. 1G. The other CPUs than the CPU Pn+1, when receiving the configuration data, broadcast their own configuration data. The CPU Pn+1, when receiving the configuration data from the other CPUs, can know the entire configuration of the system, and if necessary, it may carry out the aforementioned configuration control.

In the present system expansion embodiment, since the CCUs 4m−1 and 4m are also backed up by the additional CPU Pn+1, the reliability of service to the CCUs can be further enhanced. In addition, the number of terminals can also be increased. In this way, the present embodiment has a feature that higher multiplex communication and system expansion can be easily provided without any need of stopping the system.

(5) Sixth Embodiment

In the foregoing first to fifth embodiments, the terminal handlers TH have been switchably connected to the communication controllers in a 1:1 relation. However, all the terminal handlers TH and communication controllers may be connected to a common transmission medium, which arrangement will be explained as a sixth embodiment.

FIG. 14 is an arrangement of a distributed processing system in accordance with the sixth embodiment of the present invention, and FIG. 15 shows the format of a message to be used in the sixth embodiment.

As shown in FIG. 14, the distributed processing system of the present embodiment includes a common transmission medium 200, transmission control units 201 to 207, host computers 211 and 212, terminal handlers (THs) 221 and 222, CCUs 231 to 233, terminals 241 to 246, and memories 251 and 252.

The host computers 211 and 212 always receive data, from external devices outside the system, as source data of the terminals 241 to 246 and send the data to the common transmission medium 200 to be sent to the terminals therefrom.

The THs 221 and 222 receive the data sent to the common transmission medium 200 from the host computers 211 and 212, process and edit the received data on the basis of the contents of the memories 251 and 252, and then send the processed and edited data through the common transmission medium 200 to the CCUs 231 to 233, from which the data are further sent to the terminals 241 to 246.

The memories 251 and 252 store therein the data demanded by the terminals 241 to 246. The updating of contents of the memories 251 and 252 is carried out on the basis of data received from the terminals 241 to 246 through the common transmission medium 200.

The transmission control units 201 to 207 control data transfer between the host computers 211 and 212, THs 221 and 222, and the CCUs 231 to 233 through the common transmission medium 200.

In transmission and reception of data in the present embodiment, the data has a format including data (DATA) 120 and a content code (CC) 110 attached to the data 120, as shown in. FIG. 15. Since the data of such a format is used, the THs 221 and 222, host computers 211 and 212, and CCUs 231 to 233 can determine the necessity or non-necessity of the data 120 on the basis of the content code 110.

A data transmission system using the content code is detailed in, for example, JP-A-57-146361 and JP-A-62-42260.

Explanation will next be made as to the mutual monitoring between the processors. FIG. 13 is a flowchart showing the mutual monitoring between the processors in accordance witch an embodiment of the present invention. FIG. 16 is a diagram showing the flow of messages in the mutual monitor mode between the processors in this embodiment. FIG. 17 shows an exemplary mutual monitor table for the embodiment.

In the present embodiment, when it is desired to perform the mutual monitoring operation between the THs 221 to 221, the processors 221 to 223 respectively send, at predetermined time intervals, data attached with a content code (which data will be referred to as a "processor status check signal", hereinafter) indicative of its own processor being in operation. This data itself is attached with the identifier (refer to FIG. 20) of its own processor.

For example, when the TH 223 becomes faulty, as shown in FIG. 16, the THs 221 and 222 send respectively processor status check signals 401 and 402 having a common content code $CC_A$ and having respective data A and B, but the TH 223 cannot send such a processor status check signal.

The procedure of carrying out the mutual monitoring between the THs is shown in FIG. 13. In more detail, each TH updates the current time (step 1000) and stores the arrival times of processor status check signals received from the other THs, on a mutual monitor table such as shown in FIG. 17, on the basis of the TH identifiers described in the received processor status check signals and a timer (not shown) provided in its own TH (steps 1001 and 1002).

In the case where the TH fails to receive the processor status check signal for a time greater than a predetermined time, the TH is determined to be faulty (steps 1003 and 1004).

Figure 18:
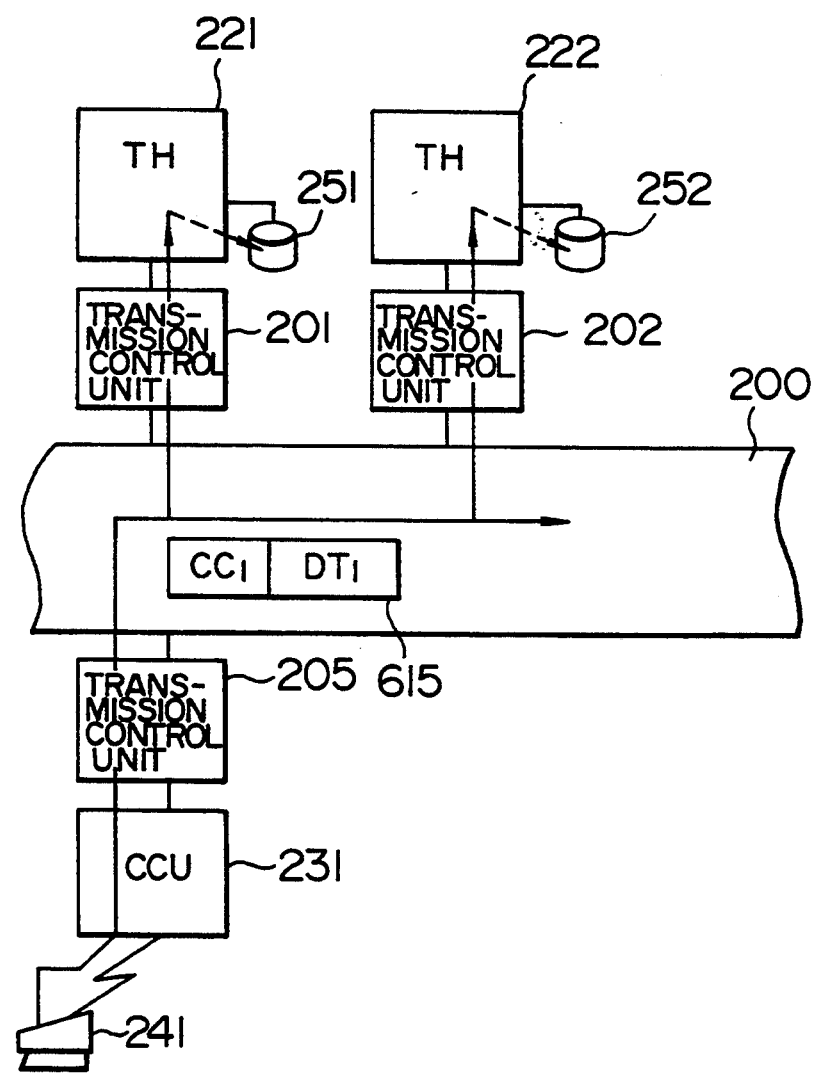
FIG. 18 is a diagram showing the flow of data in a terminal data registration mode of the embodiment of the present invention depicted in FIG. 14.
Figure 19:
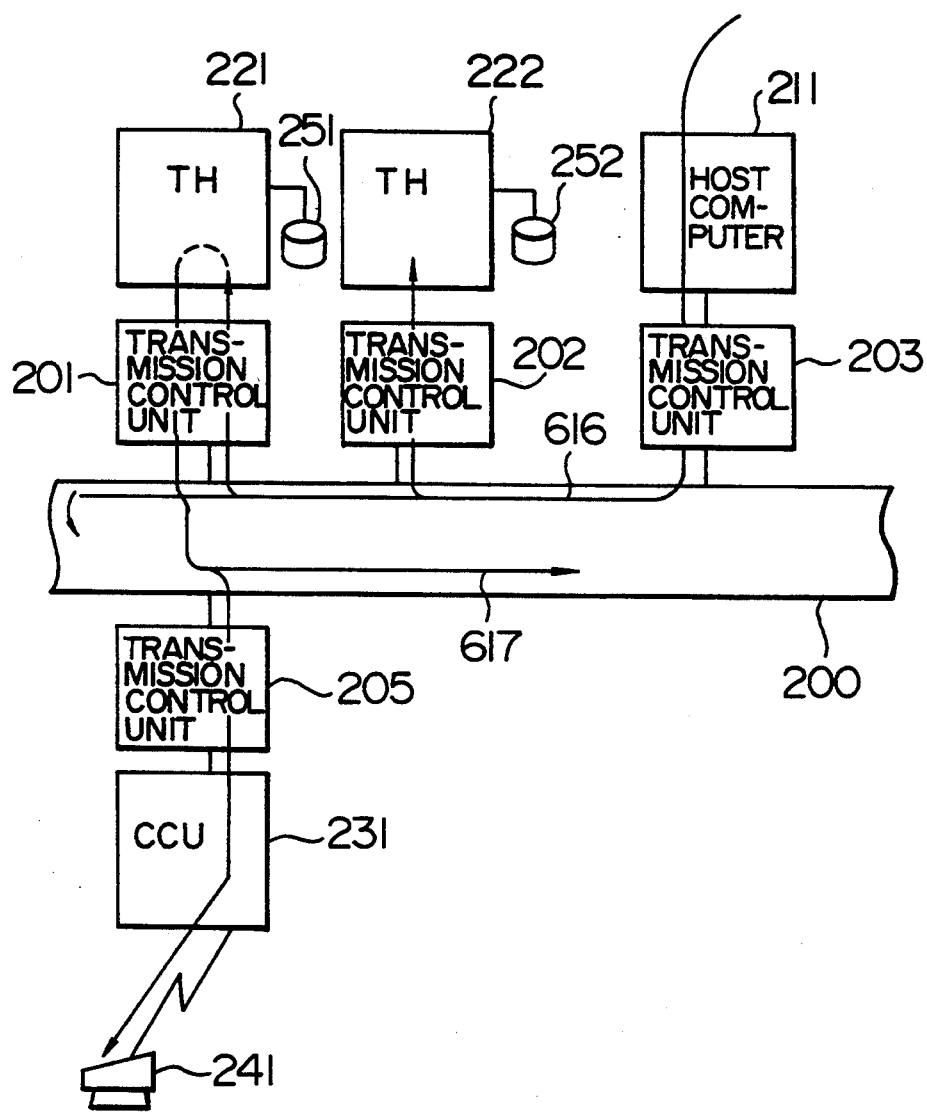
FIG. 19 is a diagram useful for showing the flow of service information from host computers to a terminal in the same embodiment of the present invention.
Figure 20:
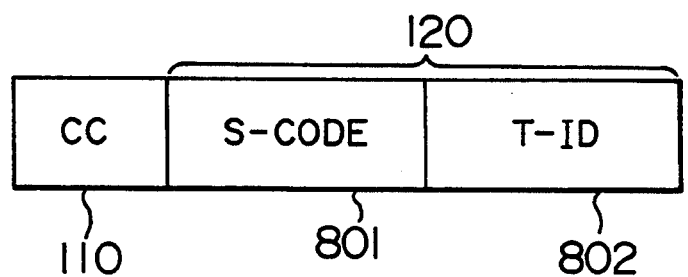
FIG. 20 shows an exemplary format of register data.
Figure 21:
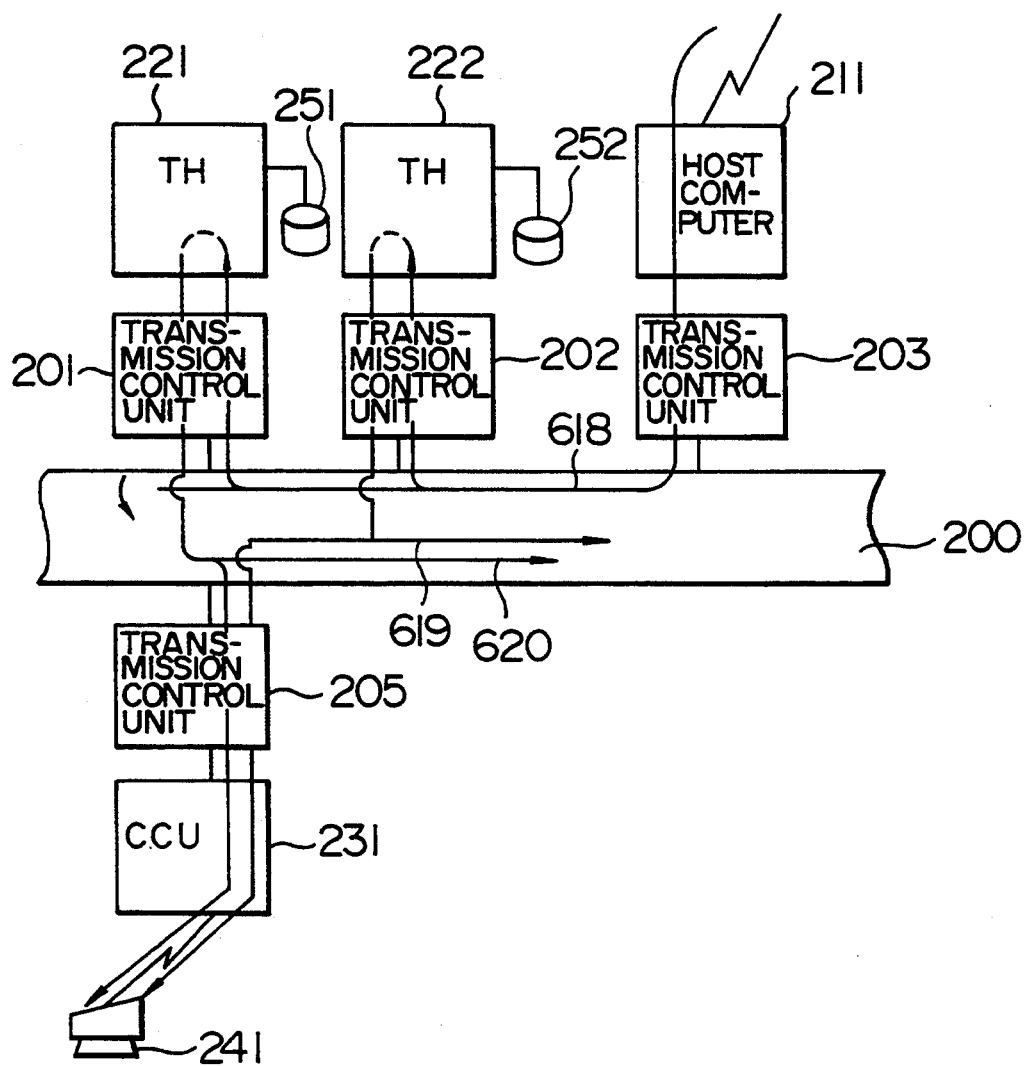
FIG. 21 is a diagram showing the flow of service information when the processors send the service information from the host computer to the multiplex-set terminal.

The service processing of THs to terminals will then be explained. FIG. 18 is a diagram useful for explaining the flow of a message at the time of registering data in a terminal in accordance with this embodiment of the present invention. FIG. 19 is a diagram useful for explaining the flow of service data from the host computer to a terminal in the embodiment. FIG. 20 shows the format of the data to be registered in the embodiment. FIG. 21 is a diagram useful for explaining the flow of service data to be sent from the host computer through the THs to the multiplex terminal.

With the present embodiment, when it is desired to provide service to the terminal 241, as shown in FIG. 18, the terminal 241 sends data 615 indicative of a desired service to the THs 221 and 222 through the CCU 231, transmission control unit 205 and common transmission medium 200, while the THs 221 and 222, when receiving the data 615, register the received data in the memories 251 and 252.

The processor 221, on the other hand, processes and edits data received from the host computer 211 and transmits the data according to its register information, as shown in FIG. 19.

The register data comprises, as shown in FIG. 20, a content code CC110 indicating that the data is to be registered, a register code (S-CODE) 801, and an identifier (T-ID) 802 of its own terminal. Accordingly, the terminal 241 attaches to the received data the content code CC110, register code 801 and identifier 802 of its own terminal to form data 615, as shown in FIG. 18, and sends the data 615 to the common transmission medium 200.

The identifier T-ID is not always required but becomes necessary only when it is desired to provide the function of managing the register data to each terminal on the side of the processors 221 and 222.

In reception of the register data, it is assumed that its content code is known, and thus the register code (S-CODE) 801 may be associated with the content code 110. Further, these content and register codes may be the same.

The TH 221, when receiving the register data from the terminal 241, stores the received register data therein, receives data 616 from the host computer 211, and confirms on the basis of the register data the presence or absence of the terminal 241 requiring the data, as shown in FIG. 19. When the TH 221 determines the presence of the terminal requiring the data, the TH 221 processes and edits the data 616 to form data 617 and send the data 617 to the common transmission medium 200. In this connection, the sent data 617 is attached with the terminal identifier 802 of the register data, as necessary.

In the case where the terminal 241 sends the data 615 without the identifier 802 attached thereto, the THs 221 and 222 determine only the presence of a terminal requiring the information 801 of the register data and attach the content code to the corresponding service information and then send it to the common transmission medium 200. In this case, as shown in FIG. 21, the THs 22i and 222 both process and edit necessary information on the basis of the data 618 received from the host computer 211 and send data (service data) 619 and 620, each having the same contents, to the common transmission medium 200 on a multiplex basis.

The backup operation of the TH in the present embodiment will next be explained. FIG. 22 shows an exemplary configuration table used in the present embodiment. In the present embodiment, in the event terminals managed by each TH are fixedly set, the occurrence of a fault in the TH causes the reduction of service to the terminals under management. To avoid this, each TH has a configuration table having TH identifiers and management terminal identifiers, such as shown in FIG. 22, to provide mutual backup with use of the described results through the mutual monitoring operation between the THs.

How to recognize terminals to be managed by each TH is different depending on the situation of the terminals. That is, (I) the case where the terminals to be managed are fixedly set, and (II) the case where one of the terminals to be manage is modified. More in detail, (I) in the case where the terminals to be managed are set fixedly, since the configuration is previously fixed, each TH recognizes ones of the terminals which are to be managed by the TH on the basis of the configuration table. Further, (II) in the case where ones of the terminals to be managed is modified, for example when the TH adds a new terminal or removes one of the terminals, the TH sends its modification data to the common transmission medium, and the other THs receive the modification data to update the configuration table. In the latter case, how to recognize the terminal after the modification is the same as in the case of the fixed configuration of the terminals.

In the backup operation, the TH having detected a fault recognizes the terminals under its management and sends data about the terminals. The TH takes in, in its register mode, the register data about the terminals from the common transmission medium.

In the present embodiment, terminal assignment or allocation is not carried out for each of the THs, but all the THs perform information service to all terminals according to the already registered code. As a result, there may occur the situation in which multiplex data flow through the common transmission medium. The processing of the multiplex data is carried out by the receiver CCU as follows. More specifically, the receiver CCU (i) transmits the received multiplex data to the terminals as it is, (ii) waits for a predetermined time to collect the multiplex data and transmits a part of the collected data to the terminals, or (iii) performs the multiplex data based on its receiver logic in such a manner that the TH previously attaches the address of the data sender to the data at the time of sending the data, and the other TH, at the time of receiving the data, determines the transmission or non-transmission to the terminals on the basis of the attached address.

Explanation will next be made as to how the CCU outputs data to the terminals.

In the present embodiment, the CCU takes in the data judged as necessary on the basis of the content code and outputs it to the terminals. The output data include (i) all terminal report data and (ii) specific terminal output data. With respect to (i) all terminal report data, the CCU outputs the report data to all the terminals directly connected to the CCU. With regard to (ii) specific terminal output data, when the specific data has a terminal identifier attached thereto, the CCU determines whether or not the terminal corresponding to the identifier is connected to its own CCU and if so, outputs the specific data only to the specific terminal.

As has been described in the foregoing, the sixth embodiment is featured in that, in addition to the features of the first embodiment, the number of CCUs can be easily increased or decreased as necessary on an on-line basis, and the number of terminals can be increased.

(6) Seventh Embodiment

In the sixth embodiment, it has been assumed that the mutual monitoring between the THs is based on the sending of processor status check signals at constant intervals. However, the present invention is not restricted to that specific example out may be applied as the seventh embodiment to be described below. Since the monitoring function is independent of the types of processors, such as host computer, TH and so on, the host computer, THs and so on will be referred to merely as the processor (s) or CPU(s).

The CPU status monitoring between the CPUs (which are assumed to be 4 of d1 to d4, and 4 in number, in the present embodiment) is performed by using two types of programs R and S.

A program S module functions to be executed at a constant period to send the aforementioned CPU status check signal. A program R module is executed in response to reception of the CPU status check signal to provide status diagnosis of the other processors.

More specifically, FIG. 23 is an exemplary monitor data table to be referenced by the program module R, showing its format and initial conditions of the system at the time of starting the system. In the drawing, reference symbol "- (hyphen )" means an indefinite value, and other parameters may be freely determined at the time of generating the system, except for a parameter "receiving interval counter" set to be 0. In the present embodiment, "threshold value" is set at 4. The parameters "threshold value", "receiving interval counter" and "previous receiving interval" are named after their roles, to be described later.

Figure 26:
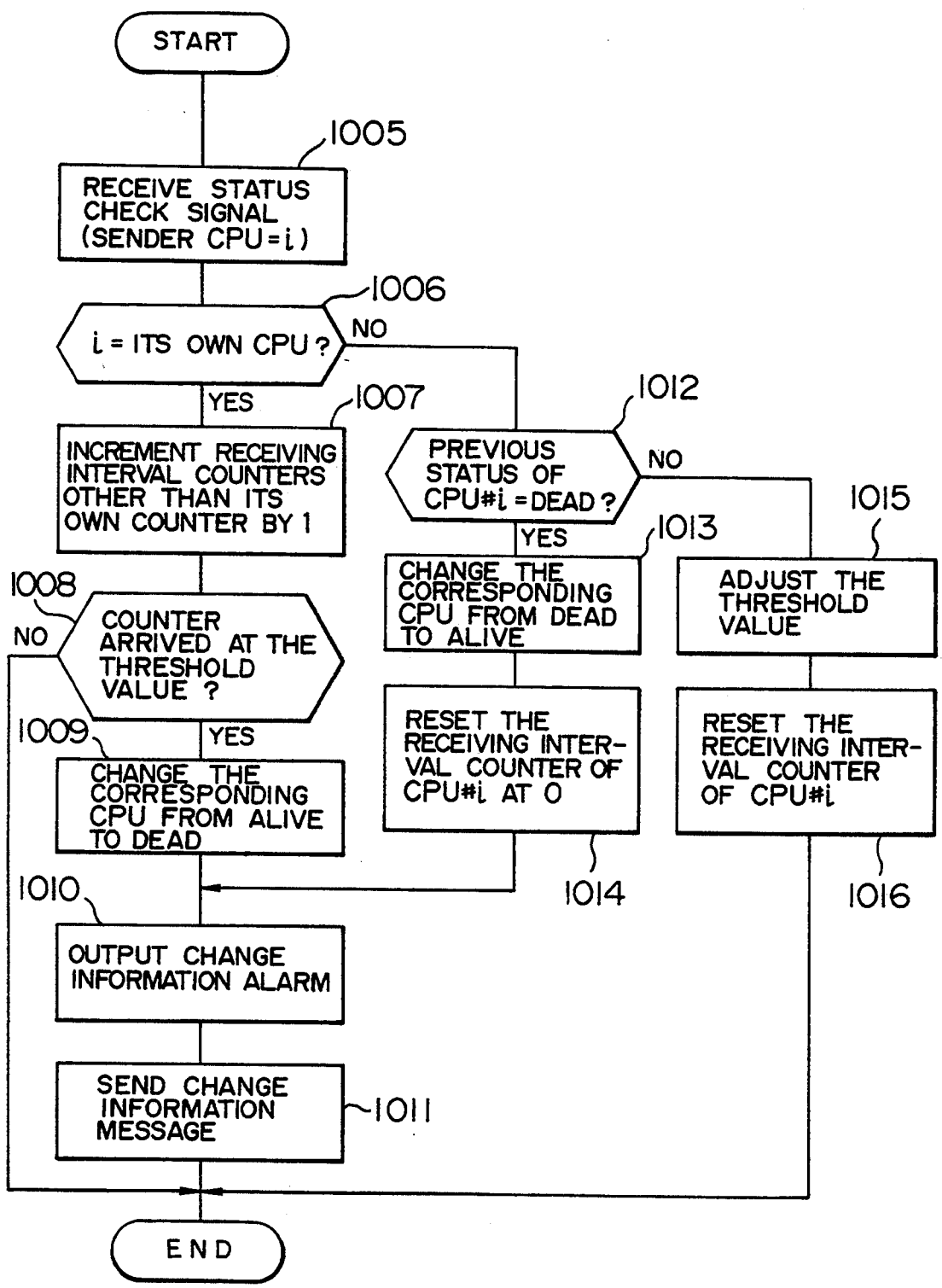
FIGS. 26 and 27 show flowcharts useful for explaining the operation of a mutual monitoring function in the further embodiment of the present invention.

The program module R at the time of receiving the processor status check signal is operated as follows in accordance with the flowchart of FIG. 26. When the sender of the processor status check signal is its own CPU, the program module R increases by 1 the receiving interval counters (except for the counter of its own CPU) in the monitor data table. For example, if its own CPU is No. 2 (d2), then components at row 1, column 1, at row 3, column 1, and at row 4, column 1 in the table of FIG. 5 are increased by 1 (steps 1006 and 1007). At this time, the module R checks the presence or absence of one of the receiving interval counters (hereinafter, which will be referred to merely as the counters) exceeding the threshold value with respect to each row, and if present, changes the status of the corresponding CPUs in the monitor data table from "alive" to "dead". For an indefinite value, the module performs no processing (steps 1008 and 1009). FIG. 24 shows an example of how to update the table when its own CPU is No. 2. A status change causes the module to send an alarm output to the terminals and also to send a necessary number of change information messages, each having contents and format such as shown in FIG. 25. In the case of the example of FIG. 6, the module sends two such messages (steps 1010 to 1011).

When the sender is not its own CPU and the corresponding CPU is "dead" in the monitor data table, the module updates The CPU status data from "dead" to "alive" and resets the receiving interval counter at 0. The module also generates the change information alarm output and the change information message (steps 1006, 1012, 1013, 1014, 1010 and 1011). If the sender is not its own CPU and the corresponding CPU is "alive" in the monitor data table, then the module performs "threshold value adjustment," to be described later, resets the receiving interval counter at 0, and then terminates its operation (steps 1006, 1012, 1015 and 1016).

Figure 27:
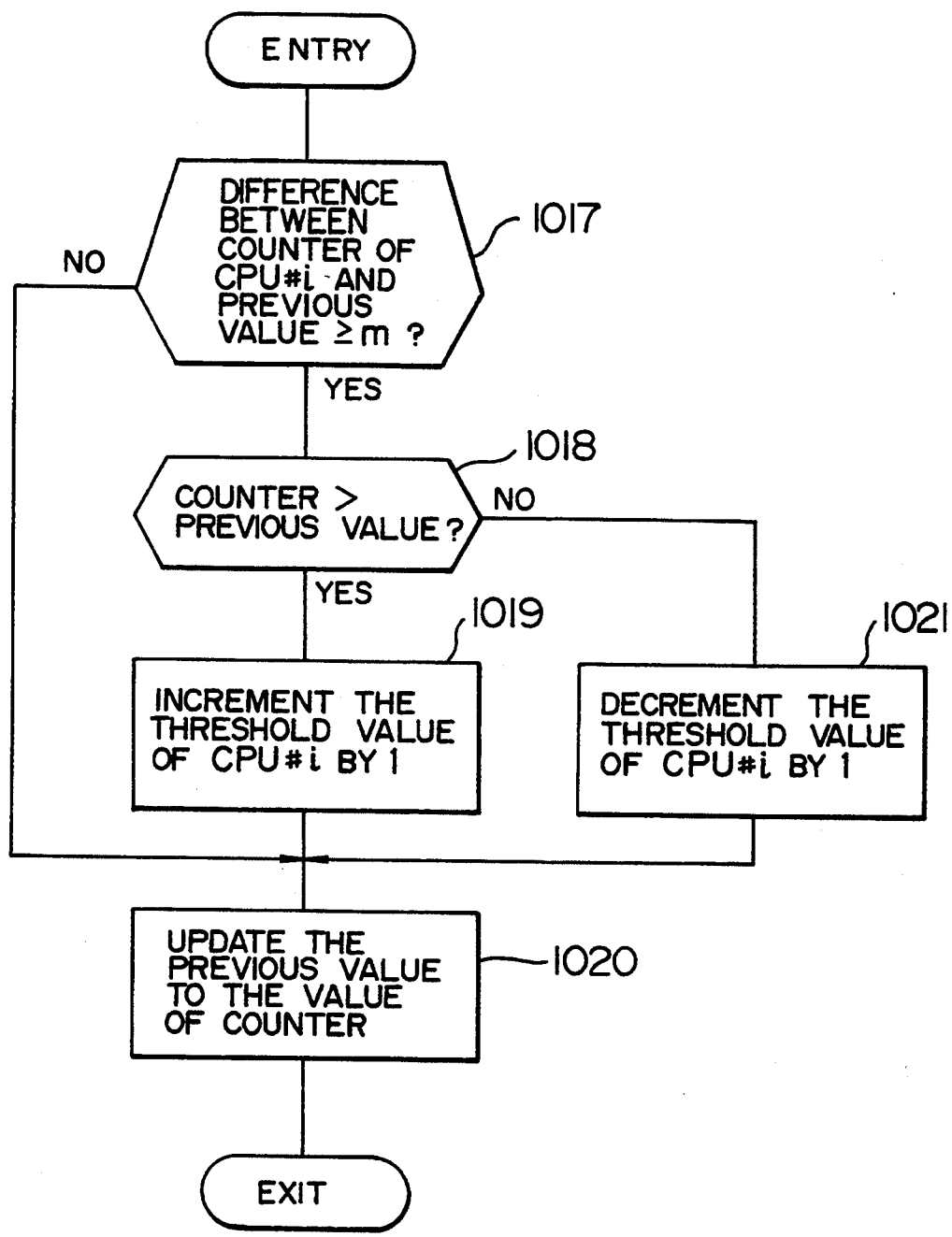

The procedure of the "threshold value adjustment" is as shown in the flowchart of FIG. 27. More concretely, the program module compares the receiving interval of the receiving interval counter of the sender CPU #i (di) with the previous receiving interval. When the former value is larger by more than m (m>0) than the latter value, the module increments the threshold value of the CPU #1 by 1 (steps 1017, 1018 and 1019). When the former is smaller by more than m than the latter, on the other hand, the module decrements the threshold value of the CPU #i (di) by 1 (steps 1017, 1018 and 1021). In any case, the modules finally update the previous receiving interval with the value of the receiving interval counter (step 1020). In this case, m is a constant determined at the time of generating the system but may be changed in the course of the operation. FIG. 28 shows an example of how to update the table when the threshold value is set to be higher; while FIG. 29 shows an example of how to update the table when the threshold value is set to be lower. In this connection, it is assumed that its own CPU number is 2 and the sender CPU number is 1 in FIG. 28 and 3 in FIG. 29, and m=2.

Table updating as shown in FIG. 28 actually takes place when the amount of data from the host computers 31 and 32 is increased to increase the load of the network and this results in the conventional arrival interval of p seconds of the CPU status check signal of the CPU d1 being changed to the arrival interval of about 3p seconds. In the normal operation, the value of the receiving interval counter varies only from 0 to 2. In the above case, however, the counter has a value as large as 3. As a result, the previous receiving interval 1 is incremented by 2 to 3, and the threshold value is correspondingly incremented from 4 to 5. Thus, even when the load is increased and the interval slightly exceeds 4p seconds, the CPU d2 can be reliably prevented from erroneously determining that the status of the CPU d1 is "dead". When such updating causes the occurrence of a true fault in the CPU d1, the detection time is not 4p seconds but 5p seconds.

Table updating such as shown in FIG. 29 actually occurs when the load of the CPU d3 or network is decreased so that the conventional arrival interval of about 3p second of the status check signal at the CPU d2 is changed to the initial arrival interval of p seconds. When the threshold value is decreased from 4 to 3, according to the procedure similar to the updating operation of FIG. 29, and thereafter the CPU d3 becomes faulty to stop the CPU status check signal, the detection time is decreased from 4p seconds to 3p seconds to permit quick fault detection.

Finally, explanation will be directed to the case where a new CPU is added. Assume now that the new CPU is #5 (d5) and the initial values of the monitor data table of the CPU are set to be the same as those of FIG. 5. It is also assumed that when the CPU d5 is connected to the network and started, the CPU immediately sends its status check signal. The modules R in the ether CPUs are operated as follows. When the module R determines that the status check signal received from the CPU d5 does not correspond to any of the CPUs d1 to d4 already registered in the table, the module R adds a new row at the end of the monitor data table to form such a table as shown in FIG. 30 (which table is for the CPU d2). To this end, it is necessary to previously make the memory zone of the monitor data table large to take the CPU expansion into consideration. The subsequent operation is carried out in the same manner as mentioned above. The module R of the CPU d5 can eliminate the need for such table expansion as mentioned above and only perform its ordinary operation.

Although the receiving intervals of the status check signals from the other CPUs have been measured on the basis of the receiving interval of the status check signal of its own CPU as a reference in the foregoing embodiments, other suitable methods may be considered. For example, the module R may be executed at constant intervals by a timer under control of an operating system (OS) so that the module, when executed by the timer, performs such operation as in the reception of its own CPU status check signal in the foregoing embodiment; while the module, when receiving the status check signal, performs such operation as in the reception of the other CPU status check signals.

The present embodiment is advantageous in that even when the load of the network is increased to cause a change of the receiving interval of the status check signal, the CPU status check monitoring operation can be performed while avoiding the erroneous determination of an alive processor.

(7) Eighth Embodiment

The transmission period or interval of the CPU status check signal has been assumed to be constant for the respective CPUs in the above seventh embodiment, but the present invention is not limited to that particular example. For example, it is considered that the CPU status check signal is attached with information relating to the transmission period of the status check signal at the current time point. In the latter case, the format of the CPU status check signal is as shown in FIG. 31, and the processing flow of the module R is substantially the same as that in the seventh embodiment, but the "threshold value adjustment" part is partially different therefrom. Explanation will next be made as to the different part alone.

Shown in FIG. 32 is a monitor data table used in the present embodiment. The threshold value adjusting procedure is carried out by setting the transmission period (or timer activation period) of its own CPU status check signal to be q msec, and when the transmission period attached to the received status check signal is r msec, by setting $[r/m]+1$ (symbol "$[\;]$" denoting Gaussian symbol) as a new threshold value.

The feature of the present embodiment is that, in addition to the feature of the seventh embodiment, when a certain CPU is intentionally to be stopped to stop generation of the configuration control operation based on the CPU, it is only necessary no set the transmission period r of its CPU status check signal to be sufficiently large. In addition, the present invention is advantageous in that since the status check signal is not transmitted always at a constant period, any message can be used as the status check signal, so long as the message satisfies the conditions which follow.

Condition 1): The message must have a transmission CPU number attached therein.

Condition 2): The message must be of a type which can be commonly transmitted from any of the CPUs.

(8) Ninth Embodiment

Figure 33:
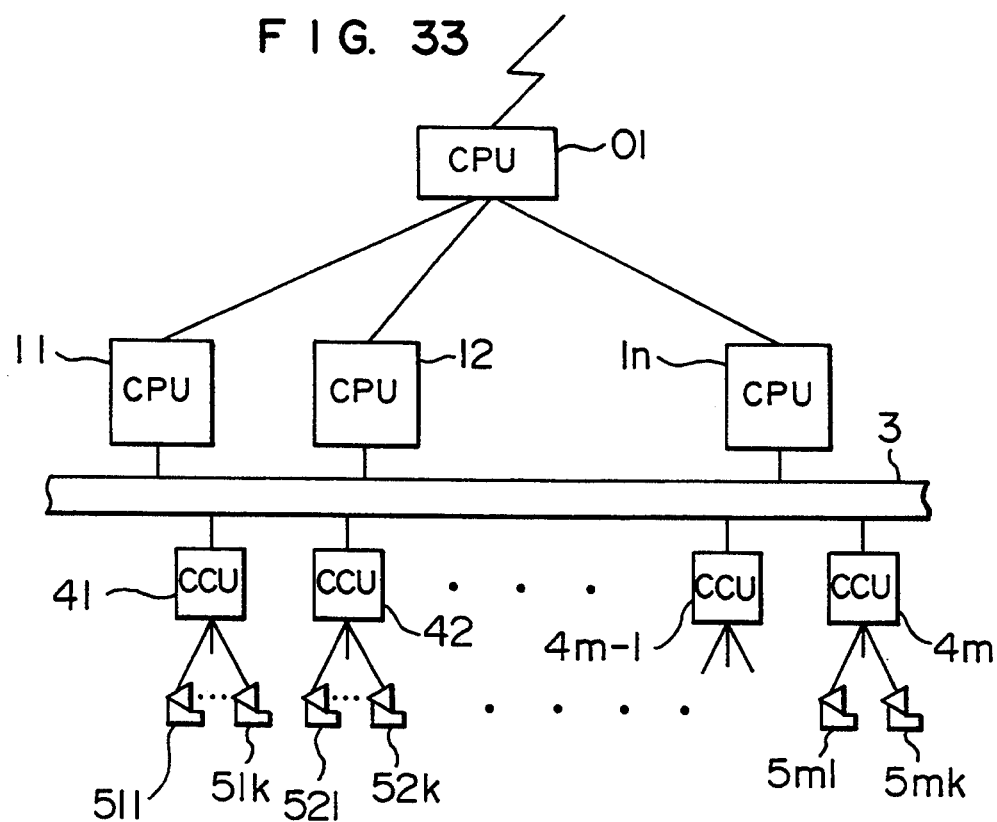
FIG. 33 shows an arrangement of an information handling system in accordance with yet another embodiment of the present invention.

The information handling system of any of the foregoing eight embodiments has been discussed in connection with two types of configurations; that is, (1) in the case where the host computers and THs are connected to the common transmission medium, and (2) in the case where the host computers, THs and CCUs are all connected to the common transmission medium. However, the present invention is not limited to the particulr examples, but other system configuration may be employed. For example, a system configuration is possible in which host computers are connected to THs in a 1:1 relation through lines, and the THs and CCUs are connected to a common transmission medium. The system configuration in the latter case is shown in FIG. 33. This system configuration is different from the second system configuration only in that the host computers are not connected to the common transmission medium and connected with the THs through lines in 1:1 relation. The operation of this system is substantially the same as that of the sixth embodiment.

The present embodiment is advantageous in that, in addition to the feature of the sixth embodiment, since on-line data to be collected by the host computers do not flow directly on the common transmission medium, the communication load of the common transmission medium can be lightened.

(9) Tenth Embodiment

Figure 34:
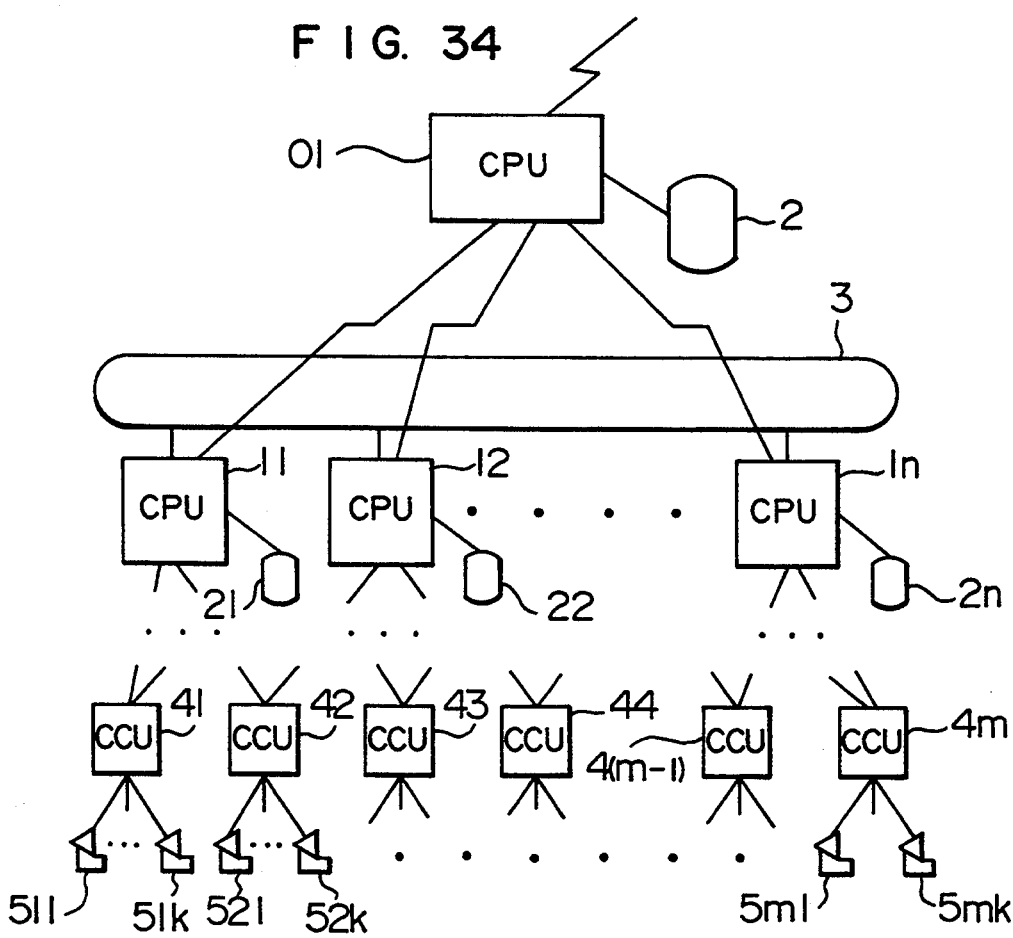

The operations explained in the first and sixth embodiments can be achieved with use of other configurations. For example, the same operation as that of the first embodiment can be achieved with use of system configurations such as shown in FIGS. 34 and 35; while the same operation as that of the sixth embodiment can be achieved with use of a system configuration including three common transmission media and computers each having both TH and CCU functions, as shown in FIG. 36. These embodiments are featured in that, in addition to the features of the first and sixth embodiments, the amount of data flowing through each of the transmission media can be reduced.

The system of the present invention, arranged as mentioned in the foregoing, has the following effects. Since computers for collecting data sent from external devices outside the system, computers for processing and distributing the collected data, and communication control units for controlling the input and output operation to terminals are connected to a common transmission medium, these elements can freely communicate regardless of their different roles in the entire system. In other words, the present invention is not subjected to any hierarchical communication restriction. In addition, since communication is based on the broadcasting of data attached with a content code and the selective reception by means of the content codes of the respective elements, the respective elements can take the place of data generation among the elements and provide business redundancy on an on-line basis while not knowing the distributed processors of their own functions.

What is claimed is:

1. An information handling system comprising:
   a plurality of processors;
   a transmission medium for transferring information between said plurality of processors;
   a plurality of communication control units;
   first connecting means for connecting any of said communication control units with any of said processors for transfer of information therebetween;
   a plurality of terminal devices; and
   second connecting means for connecting said plurality of terminal devices to said plurality of communication control units for transfer of information therebetween, permitting any terminal device to be coupled to any processor for transfer of processing information therebetween so said terminal device can be serviced by said processor during processing by said processor;
   each of said processors including (i) a central processing unit, (ii) storage means storing first information regarding processing being done with a terminal device coupled to said processor and second information indicating the communication control units connected to said processor, the communication control units connected to other processors, and the terminal devices being serviced by said processor, and (iii) management means for managing the communication control units connected to said processor, based on information stored in said storage means.

2. An information handling system as set forth in claim 1, wherein each of said plurality of processors includes means for sending to said transmission medium a message containing data and a content code indicative of contents of the data, and means responsive to content codes of messages sent onto said transmission medium from the other processors for selectively receiving the data of a message.

3. An information handling system as set forth in claim 1, wherein each of said plurality of processors includes means for sending to said transmission medium a message containing data associated with said processor, means for receiving other messages containing data sent through said transmission medium from the other processors, and means for diagnosing a fault status of the other processors on the basis of the received data.

4. An information handling system as set forth in claim 3, wherein each of said plurality of processors includes means for performing a processing operation being performed by one of the other processors which is diagnosed as faulty.

5. An information handling system as set forth in claim 1, further comprising interface means for inputting data to said transmission medium from an external device outside said system.

6. An information handling system as claimed in claim 1, wherein each of said processors further includes update means for updating the third information based on information on a management status of communication control units connected to another of said processors, and for storing the updated third information in the storing means of said processor.

7. An information handling system as claimed in claim 1, wherein each of said processors further includes diagnosis means for diagnosing a connection status of said processor with said communication control units, and update means for updating the third information stored in said processor based on the result of the diagnosis and for transmitting information indicating the connection status onto said transmission medium and to all other processors.

8. An information handling system as claimed in claim 7, wherein the update means of each processor includes means responsive to receipt of information indicating the connection status of the other processors with the communication control units for updating the second information based on the received information; said management means is responsive to the updated second information for managing said communication control units.

9. An information handling system as claimed in claim 1, wherein each of said processors further includes detection means for detecting a fault in another processor, and means responsive to detection of a fault in another processor for fetching information from the storage means of the faulty processor and performing processing for the faulty processor.

10. An information handling system as claimed in claim 1, wherein said first connecting means connects said communication control units to said transmission medium for connection to said processors.

11. An information handling method for use on an information processing system including a plurality of processors, a transmission medium for transmitting information among said plurality of processors, a plurality of communication control units, first connecting means connecting each communication control unit to at least two of said processors, a plurality of terminal devices, and second connecting means connecting each terminal device to one of said plurality of communication control units, permitting each terminal device to be serviced by any of the processors to which such communication control unit is connected, said method comprising the steps of:

(a) in each processor, storing first information regarding processing being done with terminal devices connected to a communication control unit that is connected to said processor;

(b) in each processor, storing second information indicating the communication control units connected to said processor, the communication control units connected to other processor, and the terminal devices being serviced by said processor;

(c) sending a message from one of said processors onto said transmission medium;

(d) receiving said message from said transmission medium in another one of said processors;

(e) in said another one of said processors, determining whether a terminal device connected to a communication control unit that is connected to said another one of said processors should send data in response to the received message, based on stored first and second information in said another one of said processors; and (f) based on the result of step (e), sending data from one of said terminal devices to said transmission medium.

12. An information processing method as claimed in claim 11, further comprising the steps of:

(g) in each processor, receiving information concerning the connection status of another processor from said transmission medium; and (h) in response to the information received in step (g), updating the stored second and third information.

13. An information processing method as claimed in claim 12, further comprising the step of:

(i) in one of said processors, performing processing for another processor in response to information received in step (g) indicating said another processor is unable to perform processing.

14. An information handling method as set forth in claim 11, further comprising the steps, in one of said processors, of:

sending to said transmission medium a message containing data associated with said one processor;

receiving other messages containing data sent through said transmission medium from the other processors; and diagnosing a fault status of the other processors on the basis of the received data.

15. An information handling method as set forth in claim 11, further comprising the step of transferring the operation of one of the processors diagnosed as faulty to another one of the processors.

16. An information handling method as set forth in claim 11, further comprising the step of inputting data to said transmission medium from an external device outside said system.

* * * * *